US012324366B2

(12) United States Patent
An et al.

(10) Patent No.: US 12,324,366 B2
(45) Date of Patent: Jun. 10, 2025

(54) HYDRAULIC CIRCUIT FOR AGRICULTURAL TRACTOR

(71) Applicant: LS MTRON LTD.

(72) Inventors: Sun Gi An, Anyang-si (KR); Sang Hoon Park, Anyang-si (KR); Suhwan Chun, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 0 days.

(21) Appl. No.: 18/667,461

(22) Filed: May 17, 2024

(65) Prior Publication Data

US 2024/0415044 A1 Dec. 19, 2024

(30) Foreign Application Priority Data

Jun. 15, 2023 (KR) ........................ 10-2023-0076512
Apr. 8, 2024 (KR) ........................ 10-2024-0047098

(51) Int. Cl.
*A01B 63/10* (2006.01)

(52) U.S. Cl.
CPC ................................ *A01B 63/1006* (2013.01)

(58) Field of Classification Search
CPC .... A01B 63/10; A01B 63/1006; A01B 63/002
See application file for complete search history.

(56) References Cited

U.S. PATENT DOCUMENTS 6,612,218 B2 * 9/2003 Yamaguchi .......... A01B 63/114
91/363 R

FOREIGN PATENT DOCUMENTS

| | | | |
|---|---|---|---|
| CN | 106982560 | A | 7/2017 |
| JP | 11280704 | A | * 10/1999 |
| JP | 2005295870 | A | * 10/2005 |
| KR | 20000060644 | A | 10/2000 |
| KR | 100812953 | B1 | 3/2008 |
| KR | 100928801 | B | 11/2009 |

* cited by examiner

*Primary Examiner* — Abiy Teka
(74) *Attorney, Agent, or Firm* — K&L Gates LLP

(57) ABSTRACT

Disclosed herein is a hydraulic circuit for an agricultural tractor. The hydraulic circuit includes: a hydraulic pump configured to supply hydraulic oil; a horizontal control cylinder configured to control the horizontality of a working machine for a work target surface by using a flow output from the hydraulic pump; a horizontal control valve disposed between the hydraulic pump and the horizontal control cylinder, and configured to control the operation of the horizontal control cylinder; a lifting control valve configured to control the operation of a lifting control cylinder that controls the height of the working machine for the work target surface; a lifting connection valve disposed between the hydraulic pump and the lifting control valve, and configured to selectively connect and block a flow path between the hydraulic pump and the lifting control valve; and a basic hydraulic line forming flow paths.

15 Claims, 23 Drawing Sheets

200 220 271 272 TL2 270 293b TL1 281 ③ ④ 280 293a 221 BL 282 261a 261b 262b 262a 292a 292b 230 260 261c 262c 263 ① 294 252 ② 296 295 251 290 291 PL 250 240 210 OT Lifting Control Cylinder 220
271
272
293b
293a
S2
③
④
S1
280
282
292a
292b
230
262a
294
①
②
251
291
210
OT

HYDRAULIC CIRCUIT FOR AGRICULTURAL TRACTOR

CROSS-REFERENCE TO RELATED APPLICATION

This application claims the benefits of Korean Patent Application No. 10-2023-0076512 filed on Jun. 15, 2023 and Korean Patent Application No. 10-2024-0047098 filed on Apr. 8, 2024, which are hereby incorporated by reference herein in their entirety.

FIELD

The present disclosure relates to a hydraulic circuit for an agricultural tractor.

BACKGROUND

Agricultural tractors can perform various types of agricultural work such as cultivation, fertilizer and pesticide distribution, harvesting, and transportation. Agricultural tractors are designed such that various working machines can be attached thereto and detached therefrom so that various types of work can be performed.

The working machines may be rotaries, plows, backhoes, loaders, and harvesters.

Usually, agricultural work is carried out in environments in which road surface conditions are uneven. Uneven road surface conditions at a work site can cause not only the inclination of a vehicle body but also the inclination of a working machine attached to the vehicle body.

When work is done using the working machine inclined due to the inclination of the vehicle body, the flatness of a work target area becomes poor. The work target area needs to be uniformly leveled by the working machine in a horizontal state. Accordingly, the horizontal control of the working machine is considerably required.

Generally, the horizontal control of a working machine is designed to be performed by hydraulic pressure. Hydraulic pressure is basically generated by a hydraulic pump and operates a hydraulic cylinder. Furthermore, the horizontality of the working machine is controlled by the operation of the hydraulic cylinder.

The hydraulic pressure generated by the hydraulic pump is also used to perform the height control of the working machine.

According to one example, the height of the working machine may be plowing depth, which refers to the depth by which the working machine (a plow, a rotary, or the like) is implanted into the soil from the ground surface.

According to one example, the height of the working machine may refer to the vertical distance by which the working machine is spaced upward from the ground surface.

FIG. 1 shows a hydraulic circuit 100 that is applied to a conventional agricultural tractor for the horizontal and height control of a working machine.

The hydraulic circuit 100 of FIG. 1 includes a hydraulic pump 110, a horizontal control cylinder 120, a horizontal control valve 130, a lifting control valve 140, and a priority flow control valve 150.

The hydraulic pump 110 supplies hydraulic oil, contained in the oil tank OT, to the horizontal control cylinder 120.

The horizontal control cylinder 120 operates using the flow supplied from the hydraulic pump 110. The horizontality of the working machine for a work target surface is controlled by operating the horizontal control cylinder 120.

The hydraulic oil supplied by the hydraulic pump 110 may operate a lifting control cylinder (not shown) provided to control the height of the working machine. The lifting control cylinder is disposed downstream of the lifting control valve 140 on the flow path of the hydraulic oil output from the hydraulic pump 110.

The hydraulic oil discharged from the horizontal control cylinder 120 or the lifting control cylinder may be collected in the oil tank OT.

The horizontal control valve 130 is disposed between the hydraulic pump 110 and the horizontal control cylinder 120. The horizontal control valve 130 may connect a flow path so that the hydraulic oil output from the hydraulic pump 110 is supplied to the horizontal control cylinder 120, or may close the flow path to block the supply.

In the hydraulic circuit 100 of FIG. 1, the horizontal control valve 130 operates such that the internal flow path thereof is completely opened or closed.

When the internal flow path of the horizontal control valve 130 is opened, hydraulic oil may be supplied to the horizontal control cylinder 120. In contrast, when the internal flow path of the horizontal control valve 130 is closed, hydraulic oil may not be supplied to the horizontal control cylinder 120.

The lifting control valve 140 is disposed between the hydraulic pump 110 and the lifting control cylinder. The lifting control valve 140 may connects a flow path so that the hydraulic oil output from the hydraulic pump 110 is supplied to the lifting control cylinder, or may close the flow path to block the supply.

When hydraulic oil is supplied to the lifting control cylinder, the height of the working machine is controlled. In contrast, when hydraulic oil is not supplied to the lifting control cylinder, the height of the working machine is maintained.

The priority flow control valve 150 connects a flow path so that the hydraulic oil output from the hydraulic pump 110 can be supplied to the horizontal control cylinder 120 through the horizontal control valve 130. The priority flow control valve 150 is disposed between the hydraulic pump 110 and the horizontal control valve 130.

The priority flow control valve 150 may selectively connect a flow path that allows the hydraulic oil, output from the hydraulic pump 110, to be supplied to the lifting control cylinder (not shown) through the lifting control valve 140.

The priority flow control valve 150 is installed such that the set flow is preferentially provided to the horizontal control cylinder 120 through the horizontal control valve 130.

To preferentially supply the flow to the horizontal control cylinder 120, the priority flow control valve 150 is provided as an orifice valve so that the flow flowing to the horizontal control cylinder 120 can be set preferentially. In this case, the hydraulic pressure generated by the additional flow left after being supplied from the priority flow control valve 150 to the horizontal control cylinder 120 is applied to open the flow path between the hydraulic pump 110 and the lifting control valve 140. Accordingly, the additional flow that is part of the flow output from the hydraulic pump 110 and does not pass through the priority flow control valve 150 may be used to operate the lifting control cylinder. This will be described in more detail below.

The overall flow output from the hydraulic pump 110 may be smaller than the flow set in the priority flow control valve 150. Then, the priority flow control valve 150 is maintained in a state in which the overall flow moving from the hydraulic pump 110 is supplied to the horizontal control cylinder 120 through the horizontal control valve 130.

The overall flow output from the hydraulic pump 110 may be larger than the flow set in the priority flow control valve 150. Then, the set flow out of the overall flow output from the hydraulic pump 110 is supplied to the horizontal control cylinder 120 through the priority flow control valve 150 and the horizontal control valve 130. The flow left after the supply is supplied to the lifting control cylinder through the lifting control valve 140. The priority flow control valve 150 is switched to a state in which part of the flow output from the hydraulic pump 110 is supplied to the lifting control cylinder through the lifting control valve 140. Accordingly, the hydraulic circuit 100 operates to branch the flow, supplied from the hydraulic pump 110, in the priority flow control valve 150 so that the horizontal control and height control of the working machine are simultaneously performed.

The operation of the horizontal control cylinder 120 may not be required. In this case, the horizontal control valve 130 maintains a state in which the internal flow path thereof is closed. The flow having passed through the priority flow control valve 150 is collected in the oil tank OT through the collection line 194.

As described above, in the conventional hydraulic circuit 100, the priority flow control valve 150 is designed such that the set flow is always supplied to the horizontal control valve 130 regardless of whether the horizontal control cylinder 120 operates. Accordingly, when the operation of the horizontal control cylinder 120 is not required, the overall flow supplied to the horizontal control valve 130 is collected in the oil tank OT. As a result, the loss of hydraulic pressure inevitably occurs accordingly.

Even when the horizontal control valve 130 is closed, the flow which is smaller than the set flow among the flow supplied from the hydraulic pump 110 is preferentially supplied to the horizontal control valve 130. In this case, the flow provided toward the horizontal control valve 130 is not supplied to the horizontal control cylinder 120, and thus the overall flow is collected in the oil tank OT. Accordingly, the loss of hydraulic pressure attributable to the flow provided toward the horizontal control valve 130 through the priority flow control valve 150 is inevitable.

RELATED ART DOCUMENT

Patent Document: Korean Patent Application Publication No. 10-2000-0060644A

SUMMARY

The present disclosure is intended to overcome the above-described problems, and has been conceived from an interest in technology that may ensure the efficiency of use of hydraulic pressure in a hydraulic circuit.

According to a first aspect of the present disclosure, there is provided a hydraulic circuit for an agricultural tractor, the hydraulic circuit including: a hydraulic pump configured to supply hydraulic oil; a horizontal control cylinder configured to control the horizontality of a working machine for a work target surface by using the flow output from the hydraulic pump; a horizontal control valve disposed between the hydraulic pump and the horizontal control cylinder, and configured to control the operation of the horizontal control cylinder; a lifting control valve configured to control the operation of a lifting control cylinder that controls the height of the working machine for the work target surface by using the flow output from the hydraulic pump; a lifting connection valve disposed between the hydraulic pump and the lifting control valve, and configured to selectively connect and block a flow path between the hydraulic pump and the lifting control valve; and a basic hydraulic line forming flow paths between the hydraulic pump, the horizontal control cylinder, the horizontal control valve, the lifting control valve, and the lifting connection valve; wherein the basic hydraulic line includes: a pump line connecting the hydraulic pump and the horizontal control valve; and a branch line branching off from the pump line, and connected to the lifting connection valve.

The lifting connection valve may be selectively opened and closed using part of the flow output from the hydraulic pump, and the lifting connection valve may be closed to block the flow path between the hydraulic pump and the lifting control valve and be opened to connect the flow path between the hydraulic pump and the lifting control valve.

The hydraulic circuit may further include a pilot circuit configured to generate hydraulic pressure intended to close the lifting connection valve by using the flow separated from the flow moving through the basic hydraulic line, and the lifting connection valve may have a pressure line that generates hydraulic pressure to open the lifting connection valve by using the flow separated from the flow moving through the branch line.

The lifting connection valve may include a movable element that moves in the direction in which the lifting connection valve is closed by hydraulic pressure of the pilot circuit or in the direction in which the lifting connection valve is opened by hydraulic pressure of the pressure line.

The lifting connection valve may further include a spring that applies elastic force to move the movable element in the direction in which the lifting connection valve is closed.

The basic hydraulic line may further include a first connection line and a second connection line that are disposed such that the flow having passed through the horizontal control valve moves toward the horizontal control cylinder, and the pilot circuit may generate hydraulic pressure to close the lifting connection valve by using the flow separated from the flow moving through the first connection line or the second connection line.

The pilot circuit may include: a first pilot line that branches off from the first connection line; a second pilot line that branches off from the second connection line; and a pressure line that applies hydraulic pressure to the movable element in the direction in which the lifting connection valve is closed by using the flow coming from the first pilot line or the second pilot line.

The pilot circuit may include: a first limiting valve that is installed on the first pilot line and limits the flow input to the first pilot line; and a second limiting valve that is installed on the second pilot line and limits the flow input to the second pilot line.

The pilot circuit may include: a first check valve that is installed on the first pilot line and allows the flow, input to the first pilot line, to move only toward the pressurization line; and a second check valve that is installed on the second pilot line and allows the flow, input to the second pilot line, to move only toward the pressurization line.

According to a second aspect of the present disclosure, there is provided a hydraulic circuit for an agricultural tractor, the hydraulic circuit including: a hydraulic pump configured to supply hydraulic oil; a horizontal control cylinder configured to control the horizontality of a working machine for a work target surface by using the flow output from the hydraulic pump; a horizontal control valve disposed between the hydraulic pump and the horizontal control cylinder, and configured to control the operation of the horizontal control cylinder; a lifting control valve configured to control the operation of a lifting control cylinder that controls the height of the working machine for the work target surface by using the flow output from the hydraulic pump; a lifting connection valve disposed between the hydraulic pump and the lifting control valve, and configured to selectively connect and block a flow path between the hydraulic pump and the lifting control valve; a pilot circuit provided to close the lifting connection valve so that the lifting connection valve blocks a flow path between the hydraulic pump and the lifting control valve; and a basic hydraulic line forming flow paths between the hydraulic pump, the horizontal control cylinder, the horizontal control valve, the lifting control valve, the lifting connection valve, and the pilot circuit; wherein the pilot circuit generates hydraulic pressure intended to close the lifting connection valve by using the flow separated from the flow moving through the basic hydraulic line.

The lifting connection valve may have a pressure line that generates hydraulic pressure intended to open the lifting connection valve to connect a flow path between the hydraulic pump and the lifting control valve, and the pressure line may generate hydraulic pressure intended to open the lifting connection valve by using the flow separated from the basic hydraulic line.

The lifting connection valve may be selectively opened and closed by the hydraulic pressure formed in the pilot circuit and the pressure line.

The lifting connection valve may include a movable element that moves in the direction in which the lifting connection valve is closed by the hydraulic pressure of the pilot circuit or in the direction in which the lifting connection valve is opened by the hydraulic pressure of the pressure line.

The lifting connection valve may further include a spring that applies elastic force to move the movable element in the direction in which the lifting connection valve is closed.

According to a third aspect of the present disclosure, there is provided a hydraulic circuit for an agricultural tractor, the hydraulic circuit including: a hydraulic pump configured to supply hydraulic oil; a horizontal control cylinder configured to control the horizontality of a working machine for a work target surface by using the flow output from the hydraulic pump; a horizontal control valve disposed between the hydraulic pump and the horizontal control cylinder, and configured to control the operation of the horizontal control cylinder; a lifting control valve configured to control the operation of a lifting control cylinder that controls the height of the working machine for the work target surface by using the flow output from the hydraulic pump; and a lifting connection valve provided such as, while the horizontal control cylinder is operating, the flow output from the hydraulic pump is preferentially provided to the horizontal control valve and an additional flow left after being used for the operation of the horizontal control cylinder is provided to the lifting control valve.

The lifting connection valve may be provided such that, while the operation of the horizontal control cylinder is stopped, an overall flow output from the hydraulic pump is provided to the lifting control valve.

BRIEF DESCRIPTION OF THE DRAWINGS

The above and other objects, features, and advantages of the present disclosure will be more clearly understood from the following detailed description taken in conjunction with the accompanying drawings, in which.

DETAILED DESCRIPTION

Embodiments of the present disclosure will be described in detail with reference to the accompanying drawings. For brevity of description, descriptions of well-known configurations will be omitted or abridged as much as possible.

<Overview of Agricultural Tractor>

Figure 2:
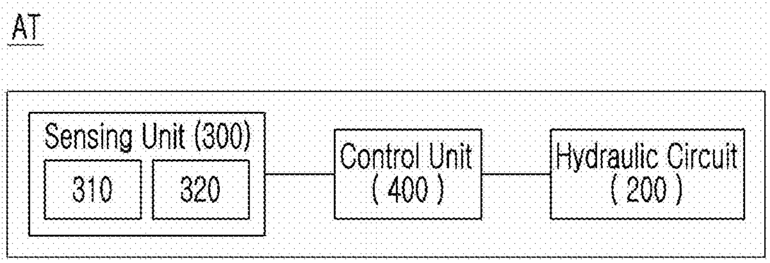
FIG. 2 is a diagram showing an example of an agricultural tractor to which a hydraulic circuit for an agricultural tractor according to an embodiment of the present disclosure is applied.

FIG. 2 illustrates an agricultural tractor AT to which a hydraulic circuit 200 for an agricultural tractor (hereinafter referred to as the "hydraulic circuit") according to an embodiment of the present disclosure is applied.

Referring to FIG. 2, the agricultural tractor AT to which the hydraulic circuit 200 according to an embodiment of the present disclosure is applied includes the hydraulic circuit 200, a sensing unit 300, and a control unit 400.

The hydraulic circuit 200 is configured to perform at least one of the horizontal control and height control of a working machine connected to the agricultural tractor AT, and a detailed description thereof will be provided later.

The sensing unit 300 may include a first sensing part 310 and a second sensing part 320.

The first sensing part 310 is configured to sense the inclination (e.g., the rolling angle) of the agricultural tractor AT that is traveling on a work target surface.

The first sensing part 310 may include at least one sensor configured to detect the inclination of a tractor body.

The first sensing part 310 may be preferably installed in the tractor body of the agricultural tractor AT.

The second sensing part 320 is configured to detect the posture of the working machine.

The second sensing part 320 may include at least one sensor configured to detect the posture of the working machine.

As an example, the second sensing part 320 may be installed in the working machine.

As another example, the second sensing part 320 may be installed in a connection device configured to connect the working machine to the agricultural tractor AT. In this case, the second sensing part 320 senses the operation of a hydraulic cylinder (e.g., a horizontal control cylinder, or a lifting control cylinder) configured to perform the posture control of the working machine. Through this, it may be possible to determine the degree of operation of a piston rod provided in the hydraulic cylinder.

The control unit 400 controls the operation of the hydraulic circuit 200, which will be described later, based on the sensing information sensed by the sensing unit 300.

For example, the control unit 400 may control the operation of the hydraulic circuit 200 to perform the horizontal control of the working machine according to the road surface condition of a work target surface.

The control unit 400 controls the hydraulic circuit 200 while determining the direction in which hydraulic pressure is provided according to continuously obtained sensing information. It is obvious that when the working machine is in a horizontal state, the provision of hydraulic pressure stops and the piston rod of the hydraulic cylinder stops advance and retreat.

For reference, the operating speed of the hydraulic cylinder may be controlled by the flow provided per hour. According to one example, the operation control of the hydraulic cylinder may be implemented using proportional control technology that performs fast or slow supply depending on the speed profile.

The control unit 400 may control the operation of the hydraulic circuit 200 to perform the height control of the working machine.

The above-described configurations are intended to briefly describe the configurations of the agricultural tractor AT to illustrate the technical features of the present disclosure. Accordingly, it is obvious that, in addition to the above-described configurations, additional configurations required for the operation of the agricultural tractor AT and the posture control of the working machine may be included.

<Description of Hydraulic Circuit for Agricultural Tractor>

Figure 3:
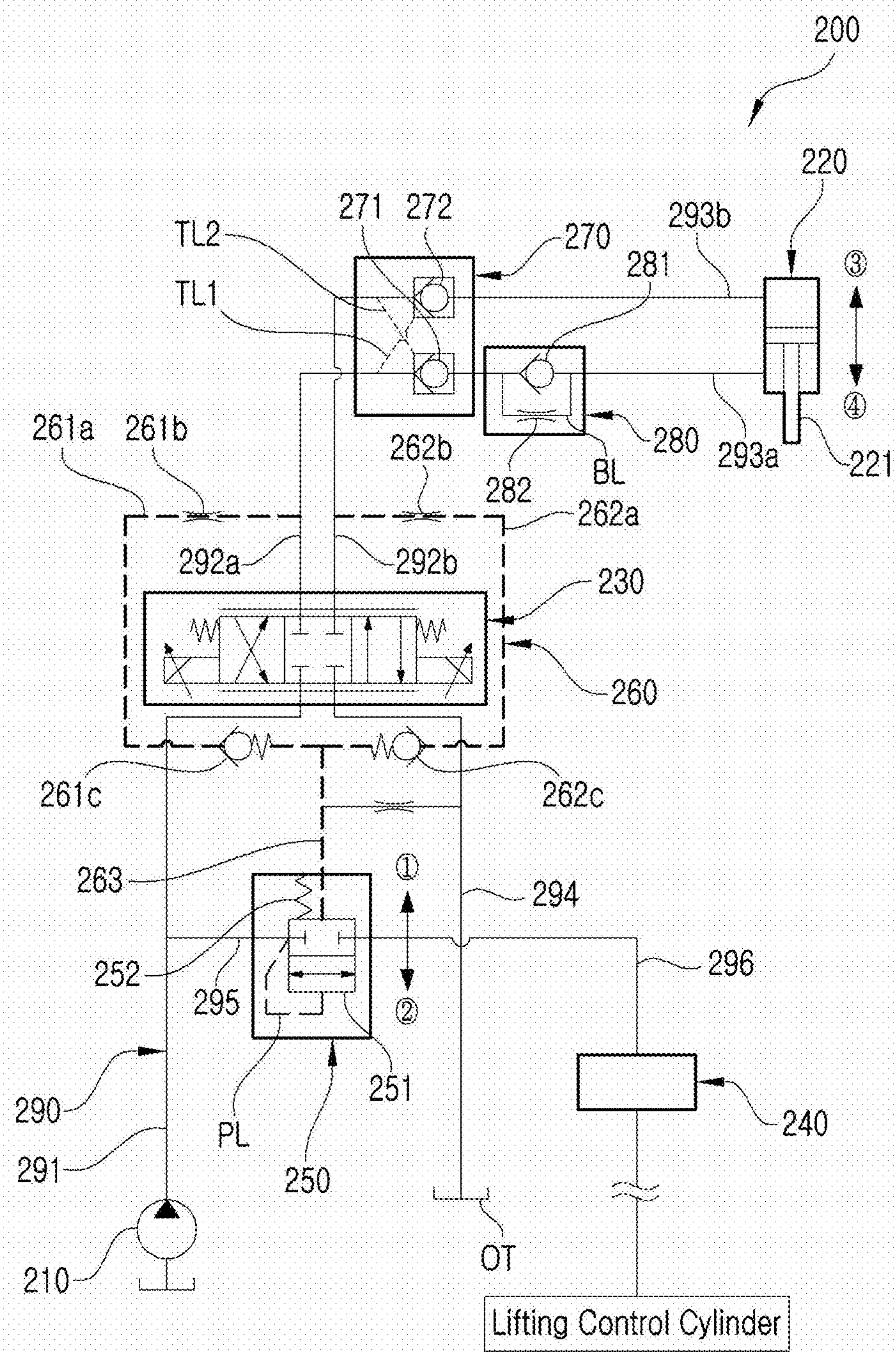
FIG. 3 is a block diagram of a hydraulic circuit for an agricultural tractor according to an embodiment of the present disclosure.

FIG. 3 shows a hydraulic circuit 200 for an agricultural tractor (hereinafter abbreviated as the "hydraulic circuit") according to an embodiment of the present disclosure.

The hydraulic circuit 200 according to the present embodiment is related to the horizontal control and height control of the working machine.

Referring to FIG. 3, the hydraulic circuit 200 includes a hydraulic pump 210, a horizontal control cylinder 220, a horizontal control valve 230, a lifting control valve 240, a lifting connection valve 250, a pilot circuit 260, a pilot check valve circuit 270, an orifice check valve circuit 280, and a basic hydraulic line 290 configured to form flow paths between individual components.

The hydraulic pump 210 is configured to supply hydraulic oil.

The hydraulic oil starts from the hydraulic pump 210, passes through the basic hydraulic line 290, and is ultimately collected in an oil tank OT.

The hydraulic oil charged in the oil tank OT is supplied from the hydraulic pump 210 to the horizontal control cylinder 220 or the lifting control cylinder through the basic hydraulic line 290, and is then collected in the oil tank OT.

In this case, the lifting control cylinder is provided to perform the height control of the working machine. Accordingly, the lifting control cylinder is disposed downstream of the lifting control valve 240.

The horizontal control cylinder 220 is configured to control the horizontality of the working machine for a work target surface by means of the flow of the hydraulic oil supplied by the hydraulic pump 210. The horizontal control cylinder 220 is operated using the flow output from the hydraulic pump 210, thereby controlling the horizontality of the working machine for the work target surface.

The degree of operation of the horizontal control cylinder 220 may vary depending on the flow provided through the horizontal control valve 230, which will be described later.

When the total amount of hydraulic oil supplied to the horizontal control cylinder 220 is large, the degree of advance or retreat of the piston rod 221 provided in the horizontal control cylinder 220 is large.

In contrast, when the total amount of hydraulic oil supplied to the horizontal control cylinder 220 is small, the degree of advance or retreat of the piston rod 221 provided in the horizontal control cylinder 220 is small.

The horizontal control valve 230 is disposed between the hydraulic pump 210 and the horizontal control cylinder 220. This horizontal control valve 230 is provided to control whether to operate the horizontal control cylinder 220 and the direction in which the horizontal control cylinder 220 operates.

Figure 4:
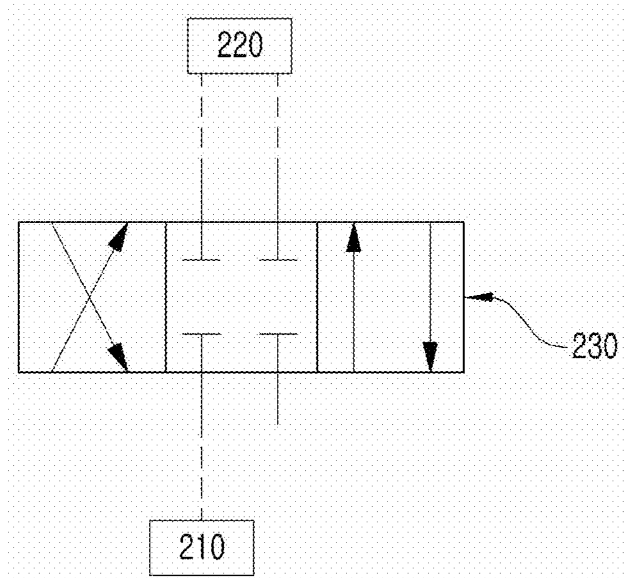
FIGS. 4 to 6 are diagrams illustrating the operating states of a horizontal control valve applied to the hydraulic circuit of FIG. 3.

For example, as shown in FIG. 4, when the horizontal control valve 230 blocks the movement of hydraulic oil between the hydraulic pump 210 and the horizontal control cylinder 220, the horizontal control cylinder 220 does not operate.

Figure 5:
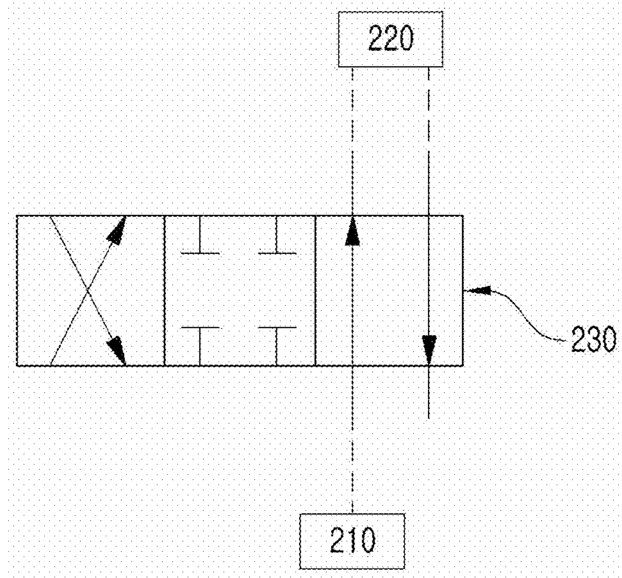
Figure 6:
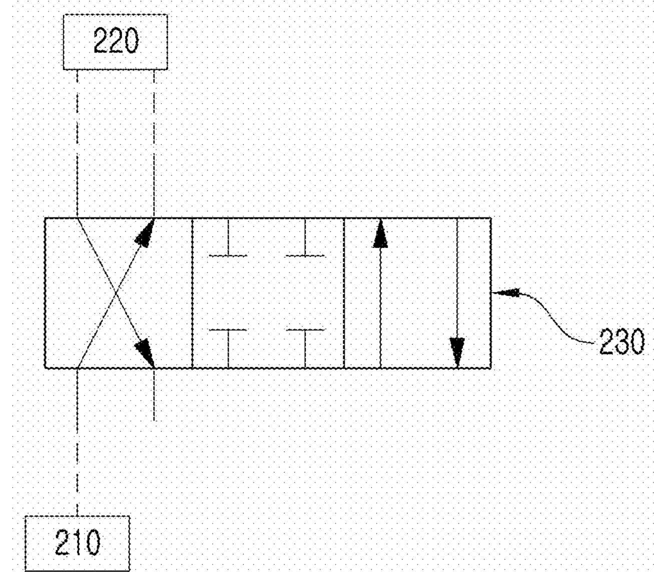

In contrast, for example, as shown in FIGS. 5 and 6, when the horizontal control valve 230 allows the movement of hydraulic oil between the hydraulic pump 210 and the horizontal control cylinder 220, the horizontal control cylinder 220 operates.

The horizontal control valve 230 may control the operation of the horizontal control cylinder 220 in one direction as shown in FIG. 5, or may control the operation of the horizontal control cylinder 220 in the other direction as shown in FIG. 6. In this case, "operation in one direction" and "operation in the other direction" are the terms that are used to define the directions in which the piston rod 221 moves (direction ③ or direction ④ in FIG. 3) as directions that are opposite to each other.

The flow having passed through the horizontal control valve 230 moves the piston rod 221 of the horizontal control cylinder 220 in one direction or in the other direction.

According to an example of the present disclosure, the horizontal control valve 230 may be provided as a proportional control valve configured to control the flow of hydraulic oil, supplied to the horizontal control cylinder 220, per unit time in response to an externally applied electrical signal.

Figure 1:
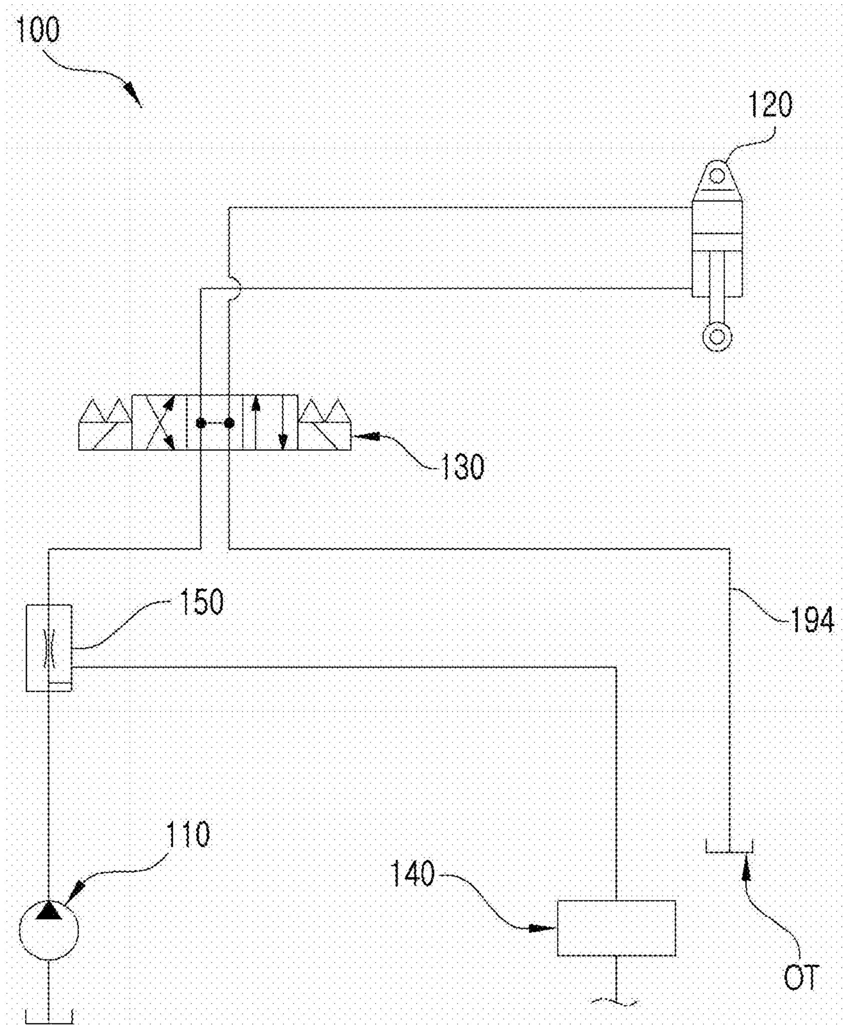
FIG. 1 illustrates a hydraulic circuit for a conventionally commonly used agricultural tractor.

An on/off valve is applied as the horizontal control valve 130 used in the conventional hydraulic circuit 100 shown in FIG. 1. Accordingly, the horizontal control valve 130 is able to provide a fixed flow to the horizontal control cylinder 120. As a result, the horizontal control cylinder 120 has to operate at a fixed speed regardless of the weight or workload of the working machine and the control target amount of operation, so that shock occurs during operation and precise control is impossible.

However, in the hydraulic circuit 200 proposed by the present disclosure, the horizontal control valve 230 may be provided as a proportional control valve capable of controlling the flow per unit time. Furthermore, the proportional control valve may control the flow per unit time, so that shock can be reduced during operation and more precise control can be performed.

The lifting control valve 240 is disposed between the hydraulic pump 210 and the lifting control cylinder. More specifically, the lifting control valve 240 is disposed between the lifting connection valve 250 and the lifting control cylinder. The flow output from the hydraulic pump 210 may be supplied to the lifting control cylinder through the lifting connection valve 250 and the lifting control valve 240. As described above, the lifting control cylinder is provided to control the height of the working machine for a work target surface by means of the flow supplied from the hydraulic pump 210. The lifting control valve 240 is provided to control whether to operate the lifting control cylinder through the opening or closing thereof. The operation of the lifting control cylinder is controlled through the lifting control valve 240.

The degree of operation of the lifting control cylinder may be controlled according to the flow provided through the lifting control valve 240. The working machine is selectively lifted and lowered according to the degree of operation of the lifting control cylinder, so that the height of the working machine is controlled.

The lifting connection valve 250 is disposed between the hydraulic pump 210 and the lifting control valve 240.

The lifting connection valve 250 selectively allows and blocks the flow, output from the hydraulic pump 210, to be supplied or not to be supplied to the lifting control cylinder through the lifting control valve 240. The lifting connection valve 250 may selectively connect and block the flow path between the hydraulic pump 210 and the lifting control valve 240.

The lifting connection valve 250 is provided such that, while the horizontal control valve 230 is closed and the operation of the horizontal control cylinder 220 is stopped, the overall flow output from the hydraulic pump 210 is provided to the lifting control valve 240. Furthermore, the lifting connection valve 250 is provided so that, while the horizontal control cylinder 220 is operated and horizontal control is performed by the horizontal control cylinder 220, the flow output from the hydraulic pump 210 is preferentially provided to the horizontal control valve 230 and the additional flow left after being used for the operation of the horizontal control cylinder 220 is provided to the lifting control valve 240. This will be described further in a related section later.

Figure 7:
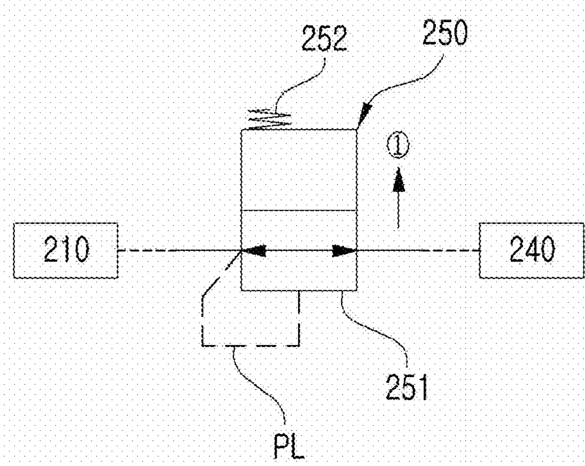
FIGS. 7 and 8 are diagrams illustrating the operating states of a lifting connection valve applied to the hydraulic circuit of FIG. 3.

Meanwhile, FIG. 7 shows a state in which the internal flow path of the lifting connection valve 250 is open. In the state of FIG. 7, the flow path between the hydraulic pump 210 and the lifting control valve 240 is open. Accordingly, the hydraulic oil output from the hydraulic pump 210 may pass through the lifting connection valve 250 and be then supplied to the lifting control cylinder through the lifting control valve 240.

Figure 8:
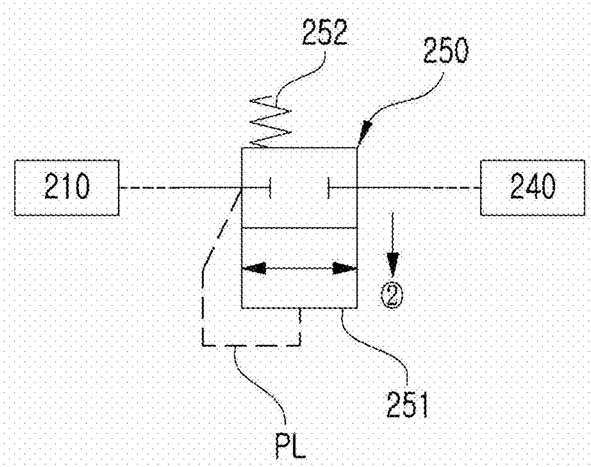

As shown in FIG. 8, the internal flow path of the lifting connection valve 250 may be closed. Then, the flow path between the hydraulic pump 210 and the lifting control valve 240 is blocked. In the state of FIG. 8, the hydraulic oil output from the hydraulic pump 210 is not supplied to the lifting control valve 240. Depending on the operating state of the lifting connection valve 250, the flow output from the hydraulic pump 210 may or may not be supplied to the lifting control cylinder. The lifting connection valve 250 allows the flow to be selectively supplied to the lifting control valve 240 and the lifting control cylinder depending on the operating state.

According to an example, the lifting connection valve 250 may be provided as a logic valve configured to be operated by the difference in hydraulic pressure between the flow paths constituting the hydraulic circuit 200. The lifting connection valve 250 may be a logic valve configured to be selectively opened and closed by part of the flow output from the hydraulic pump 210. In this case, the lifting connection valve 250 is controlled by itself within the hydraulic circuit 100, so that separate electrical or mechanical control is not required for the lifting connection valve 250.

The lifting connection valve 250 may include a movable element 251 and a spring 252.

The movable element 251 selectively opens and closes the internal flow path of the lifting connection valve 250 depending on the moving state thereof.

The spring 252 applies elastic force to the movable element 251 so that the movable element 251 moves in direction ②, which is the direction in which the internal flow path of the lifting connection valve 250 is closed.

The lifting connection valve 250 may have a pressure line PL.

The pressure line PL is formed to apply hydraulic pressure (hereinafter referred to as "first hydraulic pressure") to the movable element 251 so that the movable element 251 moves in direction ①, which is the direction in which the internal flow path of the lifting connection valve 250 is opened. The pressure line PL may be formed separately from the lifting connection valve 250.

In addition to the elastic force of the spring 252, the lifting connection valve 250 also receives hydraulic pressure to close the internal flow path by means of the pilot circuit 260, which will be described later.

The pilot circuit 260 generates hydraulic pressure to close the internal flow path of the lifting connection valve 250. The pilot circuit 260 applies hydraulic pressure (hereinafter referred to as "second hydraulic pressure") to the movable element 251 of the lifting connection valve 250 in direction ②, which is the direction in which the internal flow path is closed. The pilot circuit 260 includes a first pilot line 261*a*, a first limiting valve 261*b*, a first check valve 261*c*, a second pilot line 262*a*, a second limiting valve 262*b*, a second check valve 262*c*, a pressurization line 263, etc.

As shown in FIG. 5, when the horizontal control cylinder 220 is operated in one direction, the first pilot line 261*a*, the first limiting valve 261*b*, and the first check valve 261*c* are paired together and generate second hydraulic pressure.

The first pilot line 261*a* branches off from the basic hydraulic line 290 at a point between the horizontal control valve 230 and the horizontal control cylinder 220. More specifically, the first pilot line 261*a* branches off from the basic hydraulic line 290 at a point between the horizontal control valve 230 and the pilot check valve circuit 270, which will be described later. Accordingly, part of the flow moving from the horizontal control valve 230 to the horizontal control cylinder 220 is input to the first pilot line 261*a*.

The first limiting valve 261*b* is installed on the first pilot line 261*a* and limits the flow flowing through the first pilot line 261*a*. The first limiting valve 261*b* limits the flow that is separated from the flow directed toward the horizontal control cylinder 220 after passing through the horizontal control valve 230 and is then input to the first pilot line 261*a*. The first limiting valve 261*b* may be provided as an orifice valve.

The first check valve 261*c* is installed on the first pilot line 261*a*, and functions such that the flow input to the first pilot line 261*a* moves only toward the pressurization line 263.

When the horizontal control cylinder 220 is operated in the other direction as shown in FIG. 6, the second pilot line 262*a*, the second limiting valve 262*b*, and the second check valve 262*c* are paired together and generate second hydraulic pressure.

The second pilot line 262*a* branches off from the basic hydraulic line 290 at a point between the horizontal control valve 230 and the horizontal control cylinder 220. More specifically, the second pilot line 262*a* branches off from the basic hydraulic line 290 at a point between the horizontal control valve 230 and the pilot check valve circuit 270. Accordingly, part of the flow moving from the horizontal control valve 230 to the horizontal control cylinder 220 is input to the second pilot line 262*a*.

The second limiting valve 262*b* is installed on the second pilot line 262*a* and limits the flow flowing through the second pilot line 262*a*. The second limiting valve 262*b* limits the flow that is separated from the flow directed toward the horizontal control cylinder 220 after passing through the horizontal control valve 230 and is then input to the second pilot line 262*a*. The second limiting valve 262*b* may be provided as an orifice valve.

The second check valve 262*c* is installed on the second pilot line 262*a*, and functions such that the flow input to the second pilot line 262*a* moves only toward the pressurization line 263.

The pressurization line 263 is connected to the first pilot line 261*a* and the second pilot line 262*a*. The flow moved through the first pilot line 261*a* or the second pilot line 262*a* is input to the pressurization line 263. The pressurization line 263 may apply hydraulic pressure to the movable element 251 of the lifting connection valve 250 in direction ②, thereby closing the internal flow path of the lifting connection valve 250.

According to this embodiment, both the elastic force of the spring 252 and the second hydraulic pressure of the pressurization line 263 apply pressure to the movable element 251 in direction ②.

The lifting connection valve 250 maintains a closed state by means of the elastic force of the spring 252 when no external force is applied. Accordingly, the flow output from the hydraulic pump 210 is preferentially set to be directed toward the horizontal control valve 230.

The pilot check valve circuit 270 includes a first line check valve 271 and a second line check valve 272.

The first line check valve 271 and the second line check valve 272 allow the flow moving from the horizontal control valve 230 to the horizontal control cylinder 220 to pass therethrough, but prevent the reverse flow. The arbitrary movement of the piston rod 221 attributable to the weight of the working machine coupled to the piston rod 221 of the horizontal control cylinder 220 is prevented.

The pilot check valve circuit 270 may have a first switching line TL1 and a second switching line TL2. The first switching line TL1 and the second switching line TL2 function to open the first line check valve 271 and the second line check valve 272 so that the flow discharged from the horizontal control cylinder 220 can be collected in the oil tank OT. Depending on implementation, the first switching line TL1 and the second switching line TL2 may be formed separately from the pilot check valve circuit 270.

The orifice check valve circuit 280 is provided to appropriately limit the moving speed of the piston rod 221 when the horizontal control cylinder 220 operates.

The piston rod 221 is connected to the working machine. When the piston rod 221 moves in the direction in which the working machine is lifted, it needs to overcome the weight of the working machine. When the piston rod 221 moves in the direction in which the working machine is lowered, sudden lowering attributable to the weight of the working machine needs to be limited. Accordingly, the orifice check valve circuit 280 needs to be disposed at the location at which the moving speed of the piston rod 221 can be limited when the piston rod 221 moves in the direction in which the working machine is lowered. In the present embodiment, the orifice check valve circuit 280 is disposed between the first line check valve 271 and the horizontal control cylinder 220.

The orifice check valve circuit 280 includes a one-way valve 281 and a setting valve 282.

The one-way valve 281 passes only the flow, moving from the pilot check valve circuit 270 toward the horizontal control cylinder 220, therethrough. The one-way valve 281 may be provided as a check valve.

The setting valve 282 is installed on a bypass line BL branching off from both ends of the one-way valve 281. The setting valve 282 passes only a set flow per unit time therethrough. The setting valve 282 passes the flow, moving from the horizontal control cylinder 220 toward the pilot check valve circuit 270, therethrough. However, since only a set flow can pass through the setting valve 282, the moving speed of the piston rod 221 may be limited. The setting valve 282 may be provided as an orifice valve.

Figure 9:
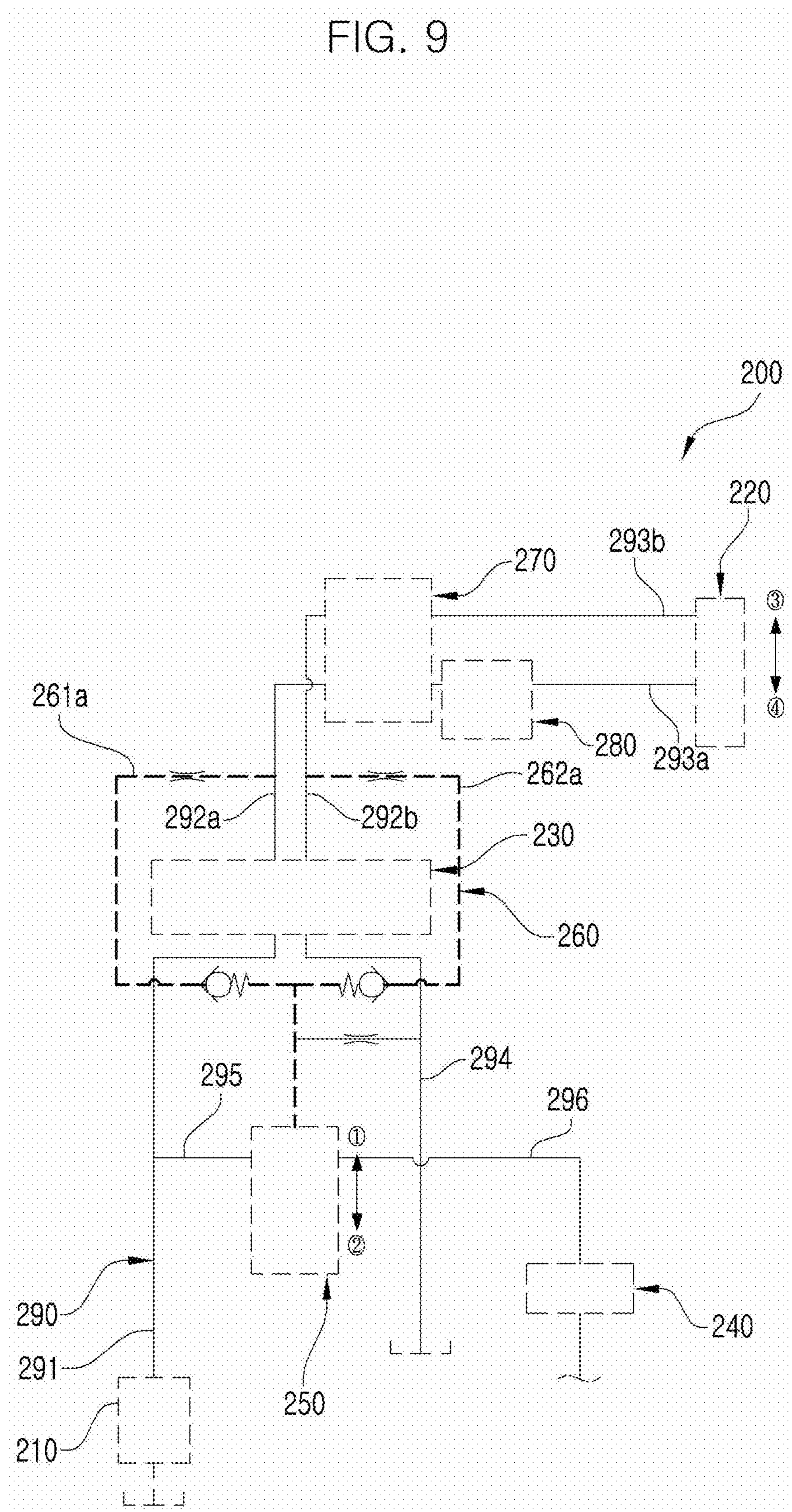
FIG. 9 is a reference diagram illustrating a basic hydraulic line applied to the hydraulic circuit of FIG. 3.

Next, the basic hydraulic line 290 will be described with reference to FIG. 3 together with FIG. 9, which is a schematic diagram.

The basic hydraulic line 290 forms flow paths between the hydraulic pump 210, the horizontal control cylinder 220, the horizontal control valve 230, the lifting control valve 240, the lifting connection valve 250, the pilot circuit 260, the pilot check valve circuit 270, the orifice check valve circuit 280, and the oil tank OT.

The basic hydraulic line 290 includes a pump line 291, a first connection line 292*a*, a second connection line 292*b*, a first operation line 293*a*, a second operation line 293*b*, a collection line 294, a branch line 295, and an elevation line 296.

The pump line 291 connects the hydraulic pump 210 and the horizontal control valve 230. Accordingly, the flow output from the hydraulic pump 210 may be input to the horizontal control valve 230 through the pump line 291.

The first connection line 292*a* is disposed such that the flow having passed through the horizontal control valve 230 can move toward the horizontal control cylinder 220. For this purpose, the first connection line 292*a* connects the horizontal control valve 230 and the pilot check valve circuit 270. More specifically, the first connection line 292*a* connects the horizontal control valve 230 and the first line check valve 271. The flow output from the horizontal control valve 230 may be input to the first line check valve 271 through the first connection line 292*a*.

The first connection line 292*a* branches off at two points.

The first pilot line 261*a* branches off from the first connection line 292*a*.

The first switching line TL1 branches off from the first connection line 292*a*.

The second connection line 292*b* is disposed such that the flow having passed through the horizontal control valve 230 can move toward the horizontal control cylinder 220. For this purpose, the second connection line 292*b* connects the horizontal control valve 230 and the pilot check valve circuit 270. More specifically, the second connection line 292*b* connects the horizontal control valve 230 and the second line check valve 272. Accordingly, the flow output from the horizontal control valve 230 may be input to the second line check valve 272 through the second connection line 292*b*.

The second connection line 292*b* branches off at two points.

The second pilot line 262*a* branches off from the second connection line 292*b*.

The second switching line TL2 branches off from the second connection line 292*b*.

The first connection line 292*a* and the second connection line 292*b* may form part of a flow path in which the flow discharged from the horizontal control cylinder 220 is directed toward the oil tank OT. The first operation line 293*a* connects the pilot check valve circuit 270 and the horizontal control cylinder 220. More specifically, the first operation line 293*a* connects the first line check valve 271 and the horizontal control cylinder 220. When the flow output from the first line check valve 271 is supplied to the horizontal control cylinder 220 through the first operation line 293*a*, the horizontal control cylinder 220 operates in one direction. Accordingly, the piston rod 221 moves in one direction, i.e., direction ③.

The orifice check valve circuit 280 may be installed on the first operation line 293*a*.

The second operation line 293*b* connects the pilot check valve circuit 270 and the horizontal control cylinder 220. More specifically, the second operation line 293*b* connects the second line check valve 272 and the horizontal control cylinder 220. When the flow output from the second line check valve 272 is supplied to the horizontal control cylinder 220 through the second operation line 293*b*, the horizontal control cylinder 220 operates in the other direction. Accordingly, the piston rod 221 moves in the other direction, i.e., direction ④.

The first operation line 293*a* and the second operation line 293*b* may form part of a flow path in which the flow discharged from the horizontal control cylinder 220 is directed toward the oil tank OT.

Depending on the operating state of the horizontal control valve 230, the pump line 291 may be connected to the first connection line 292*a* or the second connection line 292*b*. When the pump line 291 is connected to the first connection line 292*a*, the flow output through the pump line 291 moves toward the horizontal control cylinder 220 through the first connection line 292*a* and the first operation line 293*a*, and the flow discharged from the horizontal control cylinder 220 moves toward the oil tank OT through the second connection line 292*b* and the second operation line 293*b*. In contrast, when the pump line 291 is connected to the second connection line 292*b*, the flow output through the pump line 291 moves toward the horizontal control cylinder 220 through the second operation line 293*b* and the second connection line 292*b*, and the flow discharged from the horizontal control cylinder 220 moves toward the oil tank OT through the first operation line 293*a* and the first connection line 292*a*.

The collection line 294 connects the horizontal control valve 230 and the oil tank OT. The collection line 294 may be connected to the first connection line 292*a* or the second connection line 292*b* depending on the operating state of the horizontal control valve 230. The flow discharged from the horizontal control cylinder 220 may be moved to the collection line 294 through the first connection line 292*a* or the second connection line 292*b* and be then collected in the oil tank OT.

The branch line 295 branches off from the pump line 291, and is connected to the lifting connection valve 250. The branch line 295 branches off from the basic hydraulic line 290 at a point between the hydraulic pump 210 and the horizontal control valve 230. Accordingly, at least part of the flow moving to the pump line 291 may be input to the lifting connection valve 250.

The pressure line PL described above is formed to branch off from the branch line 295 and apply hydraulic pressure so that the movable element 251 moves in direction ①, which is the direction in which the internal flow path of the lifting connection valve 250 is opened. The pressure line PL forms hydraulic pressure intended to open the lifting connection valve 250 by using the flow separated from the flow moving through the branch line 295.

The lifting line 296 connects the lifting connection valve 250 and the lifting control valve 240. The flow output from the lifting connection valve 250 is input to the lifting control valve 240 and then used to operate the lifting control cylinder.

Next, the operation characteristics of each part of the hydraulic circuit 200 having the above configuration will be discussed, and then the overall operation of the hydraulic circuit 200 will be discussed.

<Description of Operation of Horizontal Control Cylinder>

An operation near the horizontal control cylinder 220 will be described with reference to the excerpt views of FIGS. 10 and 11.

The horizontal control cylinder 220 may perform an operation in one direction or an operation in the other direction. It is sufficient to understand that the operation in one direction and the operation in the other direction mean opposite operations, and the directions may vary depending on the definition.

The operation of the horizontal control cylinder 220 in one direction may be an operation in which the piston rod 221 moves in direction ③. For example, direction ③ may be the direction in which the working machine is lifted.

Figure 10:
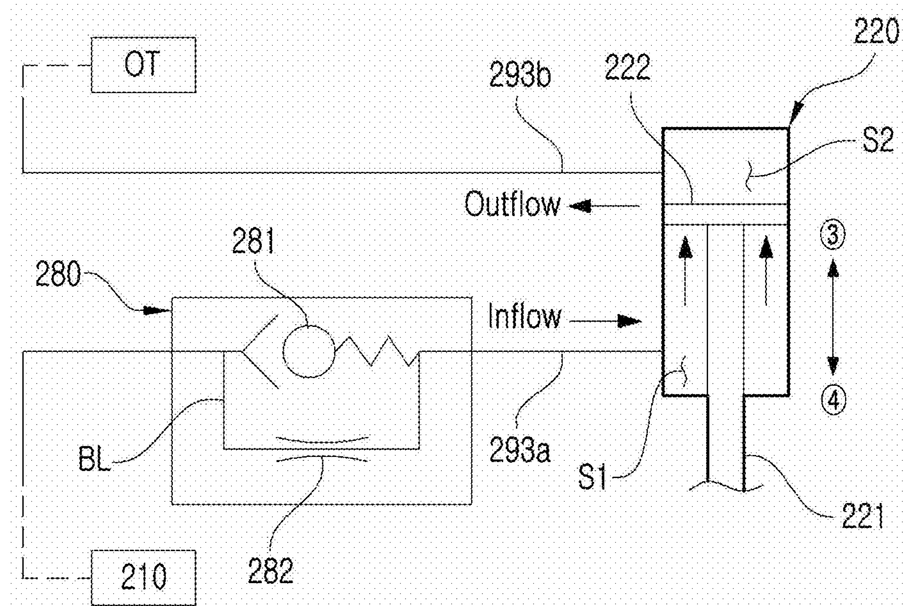
FIGS. 10 and 11 are reference diagrams illustrating an operation near a horizontal control cylinder applied to the hydraulic circuit of FIG. 3.

As shown in FIG. 10, in the operation in one direction, the flow is supplied to the horizontal control cylinder 220 through the first operation line 293*a*. More specifically, the flow supplied through the first operation line 293*a* flows into the first area S1 of the horizontal control cylinder 220. The piston rod 221 and the piston 222 are pressed in direction ③ and move in direction ③. In response to the operation in one direction, the flow in the second area S2 of the horizontal control cylinder 220 is discharged through the second operation line 293*b*.

When direction ③ is the direction in which the working machine is lifted, the working machine is lifted by the movement of the piston rod 221 in direction ③. In this case, the hydraulic pressure that can overcome even the weight load of the working machine needs to be applied to the piston rod 221.

The operation of the horizontal control cylinder 220 in the other direction may be an operation in which the piston rod 221 moves in direction ④.

Figure 11:
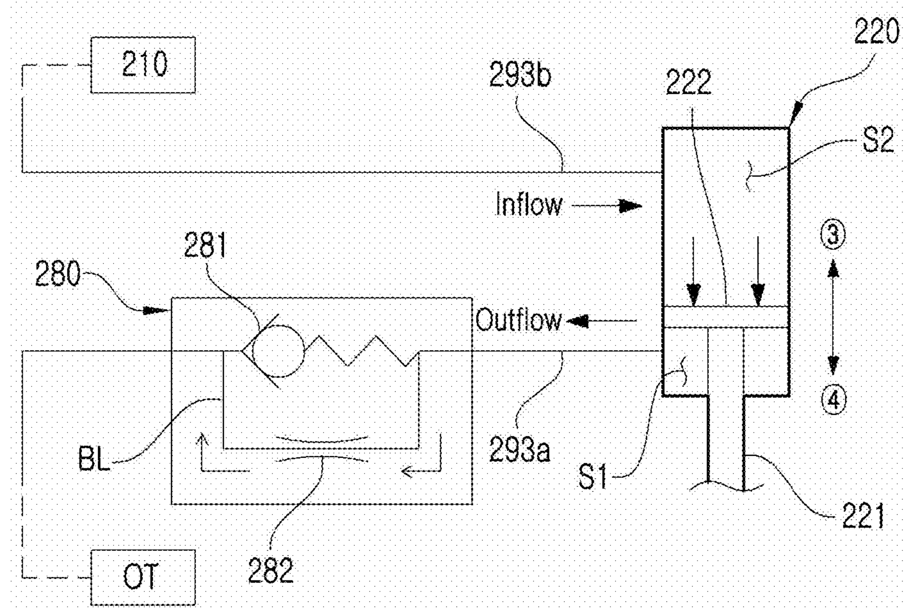

As shown in FIG. 11, in the operation in the other direction, flow is supplied to the horizontal control cylinder 220 through the second operation line 293*b*. More specifically, the flow supplied through the second operation line 293*b* flows into the second area S2 of the horizontal control cylinder 220. The piston rod 221 and the piston 222 are pressed in direction ④ and move in direction ④. In response to the operation in the other direction, the flow in the first area S1 of the horizontal control cylinder 220 is discharged through the first operation line 293*a*. Direction ④ is the direction in which the working machine is lowered. Accordingly, an implementation may be made such that the discharged flow moves through the bypass line BL of the orifice check valve circuit 280. Since the setting valve 282 is disposed in the bypass line BL, the discharged flow needs to pass through the setting valve 282. Only the limited flow set per unit time passes through the setting valve 282, so that the movement of the piston rod 221 in direction ④ is limited accordingly. When the piston rod 221 moves in direction ④, both the hydraulic pressure applied in the second area S2 and the weight of the working machine connected to the piston rod 221 are applied. However, the speed at which hydraulic pressure is released from the first area S1 is limited by the setting valve 282, so that the sudden movement of the piston rod 221 and resulting shock are prevented.

<Description of Operating States of Horizontal Control Valve>

An operation near the horizontal control valve 230 will be described with reference to the excerpt views of FIGS. 12 to 14.

The horizontal control valve 230 may be operated by electromagnetic force in response to a control signal from the control unit 400. The horizontal control valve 230 may have three states.

Figure 12:
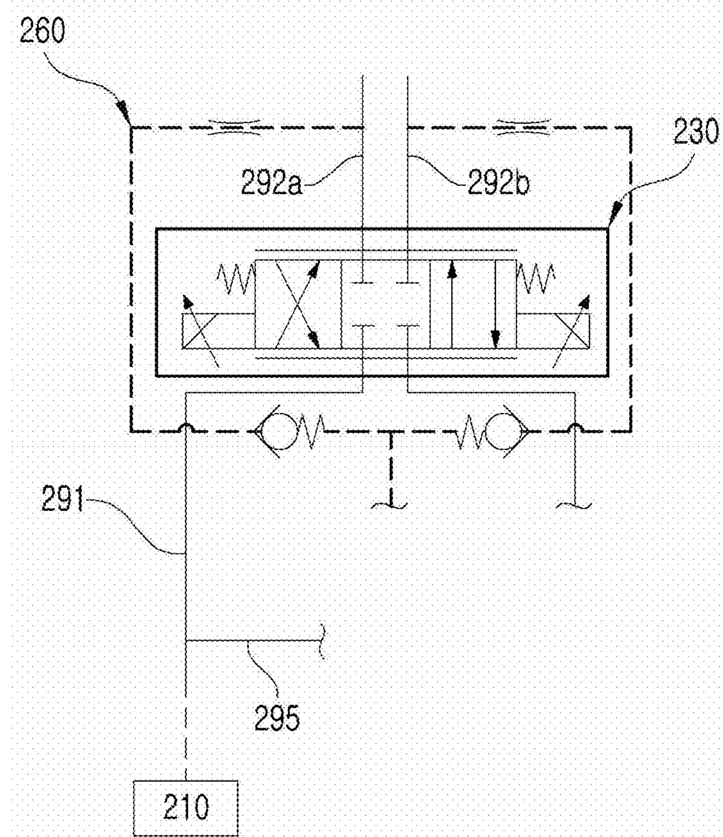
FIGS. 12 to 14 are reference diagrams illustrating an operation near a horizontal control valve applied to the hydraulic circuit of FIG. 3.
Figure 13:
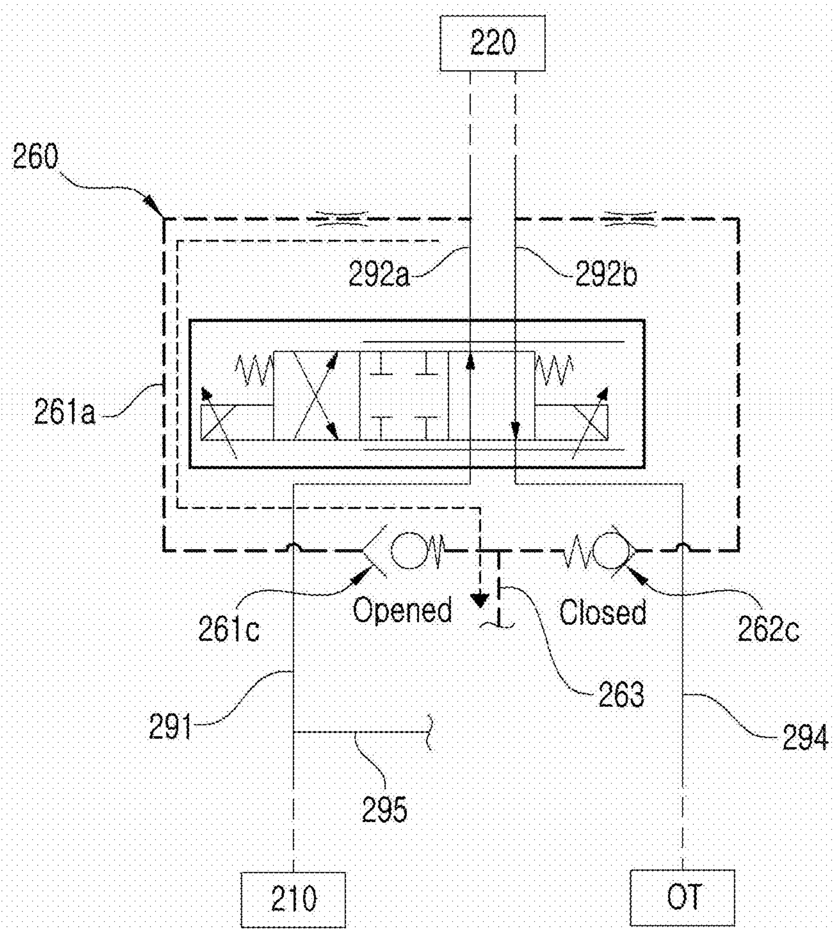
Figure 14:
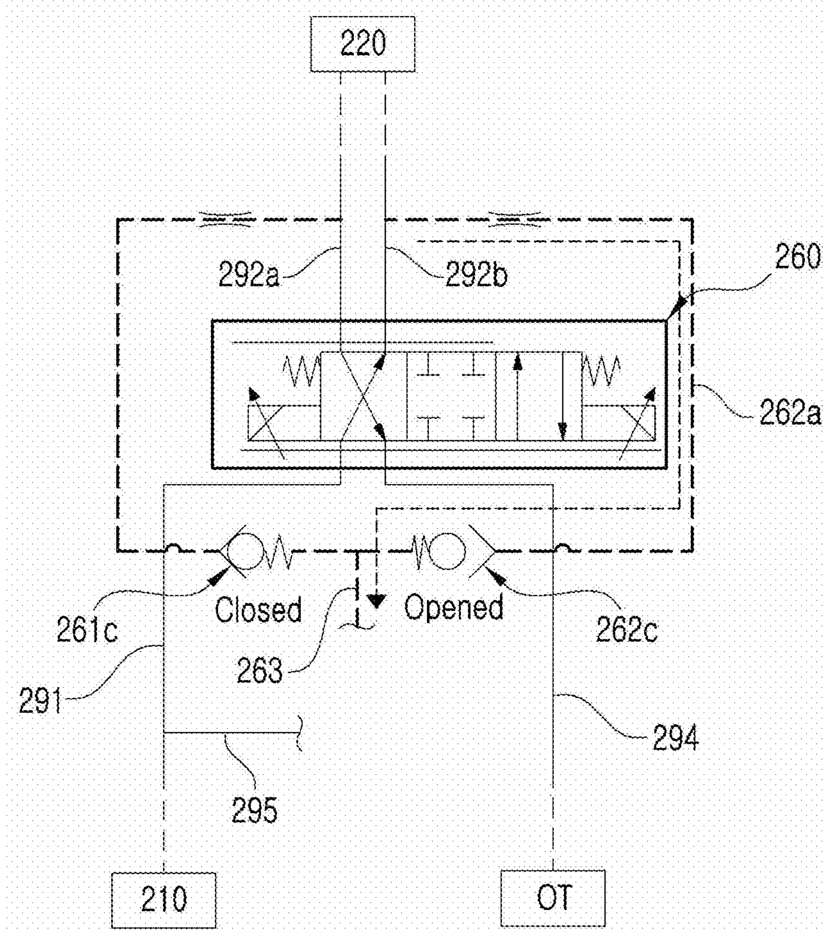

FIG. 12 shows a first state, FIG. 13 shows a second state, and FIG. 14 shows a third state. FIGS. 12, 13, and 14 correspond to FIGS. 4, 5, and 6, respectively.

In the first state, the pump line 291 is separated from both the first connection line 292*a* and the second connection line 292*b*. Accordingly, the overall flow output from the hydraulic pump 210 moves to the branch line 295. The horizontal control cylinder 220 maintains its original state, and the pilot circuit 260 also does not operate.

In the second state, the pump line 291 is connected to the first connection line 292*a*, and the second connection line 292*b* is connected to the collection line 294. The flow output from the hydraulic pump 210 may be supplied to the horizontal control cylinder 220 through the first connection line 292*a*, and the flow discharged from the horizontal control cylinder 220 may be collected in the oil tank OT through the second connection line 292*b* and the collection line 294. In the second state, the flow separated from the first connection line 292*a* is input to the pressurization line 263 through the first pilot line 261*a*. Accordingly, the movable element 251 is pressed in direction ② by the second hydraulic pressure generated by the pressurization line 263.

In the third state, the pump line 291 is connected to the second connection line 292*b*, and the first connection line 292*a* is connected to the collection line 294. The flow output from the hydraulic pump 210 may be supplied to the horizontal control cylinder 220 through the second connection line 292*b*, and the flow discharged from the horizontal control cylinder 220 may be collected in the oil tank OT through the first connection line 292*a* and the collection line 294. In the third state, the flow separated from the second connection line 292*b* is input to the pressurization line 263 through the second pilot line 262*a*. Accordingly, the movable element 251 is pressed in direction ② by the second hydraulic pressure generated by the pressurizing line 263.

According to the present embodiment, an implementation may be made such that since the pressurization line 263 needs to be connected to both the first pilot line 261*a* and the second pilot line 262*a*, the first pilot line 261*a* and the second pilot line 262*a* communicate with each other as a result. However, the flow input to the first pilot line 261*a* by the first check valve 261*c* and the second check valve 262*c* is passed over to the second pilot line 262*a*, or the flow input to the second pilot line 262*a* is not passed over to the first pilot line 261*a*. The flow input to the first pilot line 261*a* or the second pilot line 262*a* is used only to generate the second hydraulic pressure in the pressurization line 263.

<Description of Operation of Lifting Connection Valve>

The operation of the lifting connection valve 250 will be described with reference to the excerpt views of FIGS. 15 and 16.

The movable element 251 of the lifting connection valve 250 receives elastic force in direction ② by means of the spring 252. Accordingly, when no other force is applied, the movable element 251 maintains the state of having moved in direction ②. Accordingly, as shown in FIG. 15, the lifting connection valve 250 is maintained in a closed state.

When the pilot circuit 260 operates according to the operation of the horizontal control valve 230, the movable element 251 receives hydraulic pressure (second hydraulic pressure) in direction ② through the pressurization line 263.

When the flow is moved toward the lifting connection valve 250 through the branch line 295, the flow is separated again and input into the pressure line PL. The movable element 251 receives hydraulic pressure (first hydraulic pressure) in direction ① through the pressure line PL.

The elastic force of the spring 252, the second hydraulic pressure of the pressurization line 263, and the first hydraulic pressure of the pressure line PL may be all applied to the movable element 251. The direction in which the movable element 251 moves is determined depending on which of the sum of the elastic force and the second hydraulic pressure and the first hydraulic pressure is higher.

Figure 15:
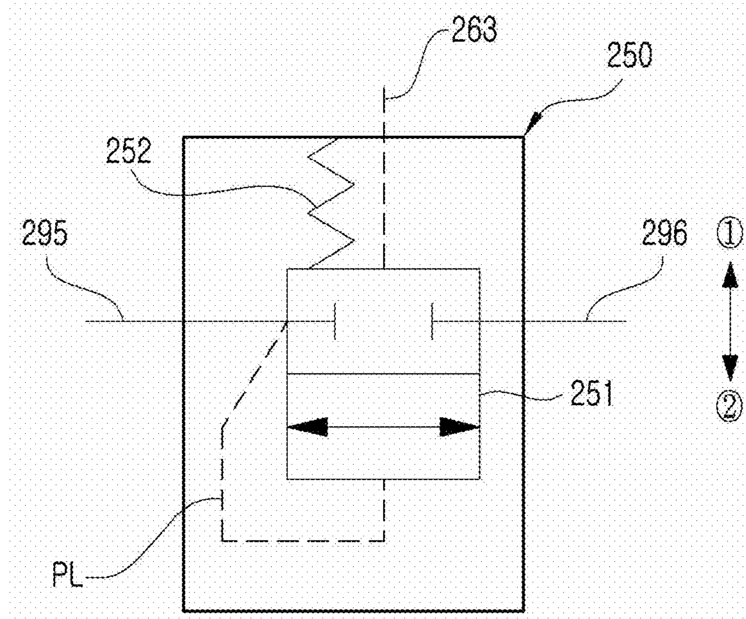
FIGS. 15 and 16 are reference diagrams illustrating an operation near a lifting connection valve applied to the hydraulic circuit of FIG. 3.

When the sum of the elastic force and the second hydraulic pressure is higher than the first hydraulic pressure, the movable element 251 moves in direction ②, so that the lifting connection valve 250 is closed, as shown in FIG. 15. In this case, the overall flow output from the hydraulic pump 210 may be used only for the operation of the horizontal control cylinder 220.

Figure 16:
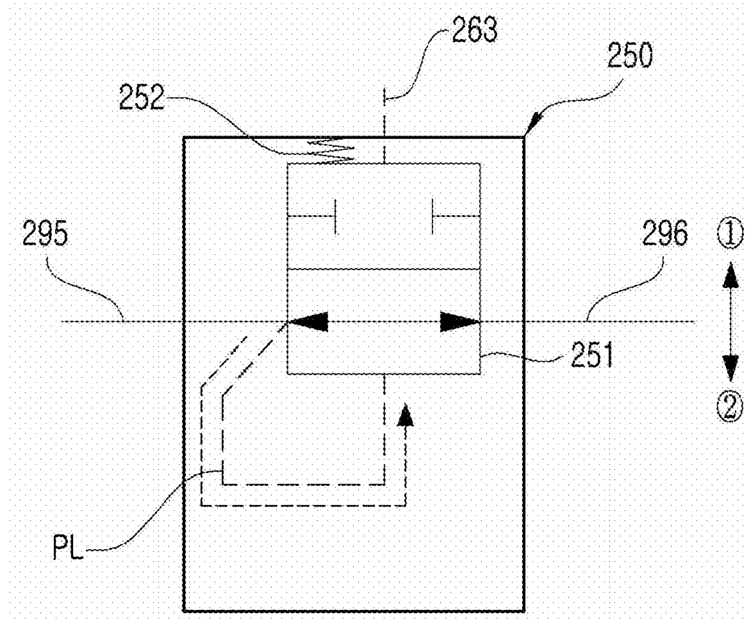

In contrast, when the sum of the elastic force and the second hydraulic pressure is lower than the first hydraulic pressure, the movable element 251 moves in direction ①, so that the lifting connection valve 250 is opened, as shown in FIG. 16. In this case, the flow separated from the pump line 291 is input to the lifting control valve 240 through the branch line 295, the lifting connection valve 250, and the lifting line 296, and operates the lifting control cylinder.

The operation of the lifting connection valve 250 described above enables the preferential operation of the horizontal control cylinder 220. This will be described in more detail below.

In order for the lifting control cylinder to operate, the lifting connection valve 250 needs to be opened. In order for the lifting connection valve 250 to be opened, the first hydraulic pressure needs to be higher than the sum of the elastic force of the spring 252 and the second hydraulic pressure. In a first case in which the horizontal control valve 230 is closed or in a second case in which the additional flow left after being used for the operation of the horizontal control cylinder 220 is generated, the first hydraulic pressure may be higher than the sum of the elastic force and the second hydraulic pressure. In the first case, the overall flow passes through the lifting control valve 240, and in the second case, the additional flow left passes through the lifting control valve 240. The flow having passed through the lifting control valve 240 may be used for the operation of the lifting control cylinder.

<Description of Operation of Pilot Check Valve Circuit>

Figure 17:
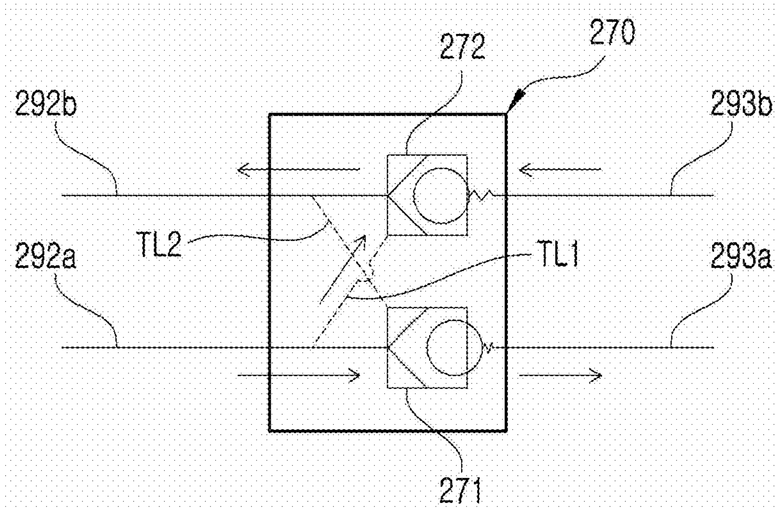
FIGS. 17 and 18 are reference diagrams illustrating an operation near a pilot check valve circuit applied to the hydraulic circuit of FIG. 3.
Figure 18:
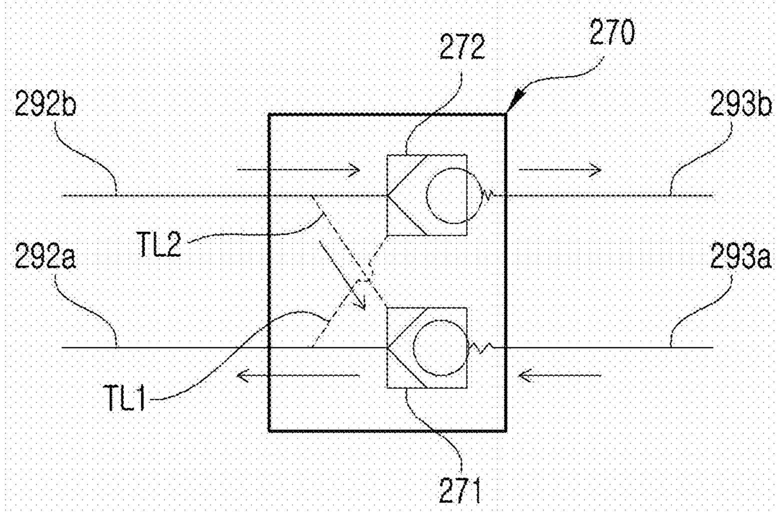

The operation of the pilot check valve circuit 270 will be described with reference to the excerpt views of FIGS. 17 and 18.

In the second state shown in FIG. 13, the flow is input to the first line check valve 271 through the first connection line 292*a*. As shown in FIG. 17, the first line check valve 271 is switched to an open state. The flow moving through the first connection line 292*a* passes through the first line check valve 271, passes through the first operation line 293*a*, and then flows into the first area S1 of the horizontal control cylinder 220. In this case, the flow separated from the first connection line 292*a* to the first switching line TL1 generates hydraulic pressure that slightly opens the second line check valve 272. Accordingly, the flow discharged from the second area S2 of the horizontal control cylinder 220 may be collected in the oil tank OT through the second operation line 293*b* and the second connection line 292*b*.

In the third state shown in FIG. 14, the flow is input to the second line check valve 272 through the second connection line 292*b*. As shown in FIG. 18, the second line check valve 272 is switched to an open state. The flow moving through the second connection line 292*b* passes through the second line check valve 272, passes through the second operation line 293*b*, and then flows into the second area S2 of the horizontal control cylinder 220. In this case, the flow separated from the second connection line 292*b* to the second switching line TL2 generates hydraulic pressure that slightly opens the first line check valve 271. Accordingly, the flow discharged from the first area S1 of the horizontal control cylinder 220 may be collected in the oil tank OT through the first operation line 293*a* and the first connection line 292*a*.

<Description of Flow of Overall Flow of Hydraulic Circuit>

1. Operation in First State

Figure 19:
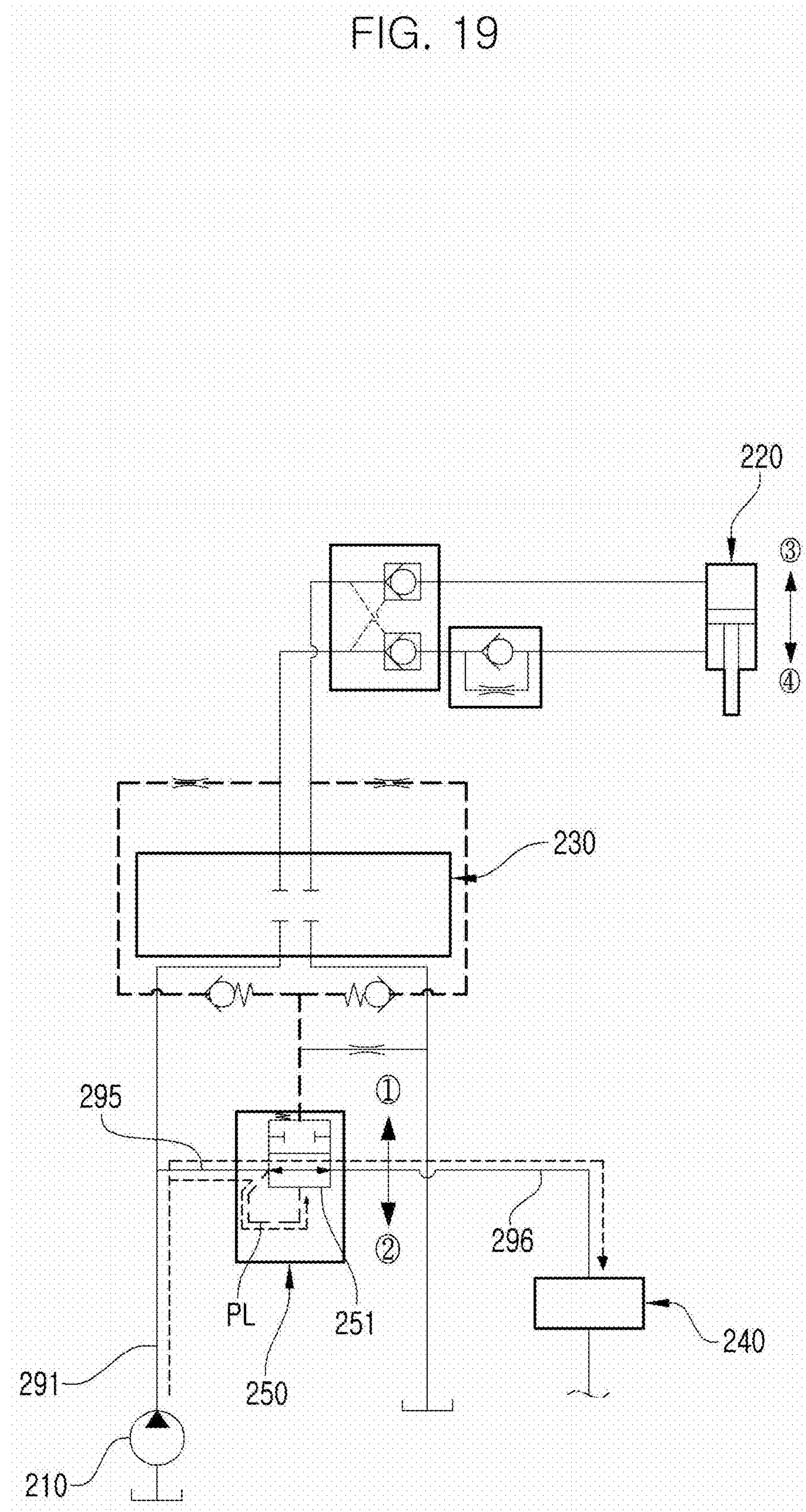
FIGS. 19 to 23 are reference diagrams illustrating the overall operation of the hydraulic circuit according to the present disclosure.

FIG. 19 shows the flow of the overall flow in the first state (see the dotted arrows).

In the first state shown in FIG. 12, the horizontal control valve 230 is closed. Accordingly, the flow output from the hydraulic pump 210 does not move toward the horizontal control cylinder 220. Therefore, the operation of the horizontal control cylinder 220 is stopped. While the operation of the horizontal control cylinder 220 is stopped, the overall flow output from the hydraulic pump 210 moves to the pressure line PL through the branch line 295 and applies first hydraulic pressure to the movable element 251 in direction ①. When the first hydraulic pressure becomes higher than the elastic force of the spring 252, the movable element 251 moves in direction ① as shown in FIG. 19, so that the lifting connection valve 250 is opened. The flow output from the hydraulic pump 210 is input to the lifting control valve 240 through the branch line 295, the lifting connection valve 250, and the lifting line 296, thereby operating the lifting control cylinder.

In the first state, the overall flow output from the hydraulic pump 210 is used only to selectively lift and lower the working machine. In other words, in the first state, the overall flow output from the hydraulic pump 210 is used only to operate the lifting control cylinder.

2. Operation in Second State

Figure 20:
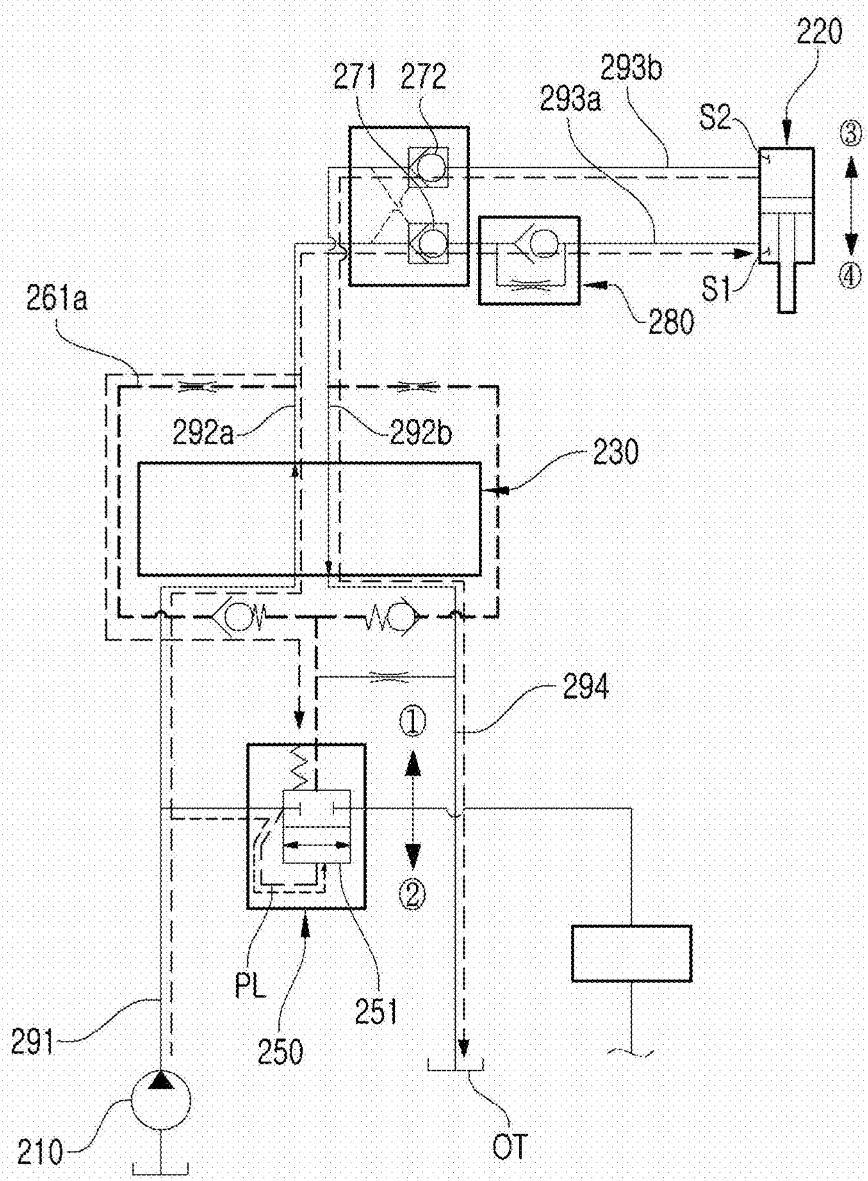
Figure 21:
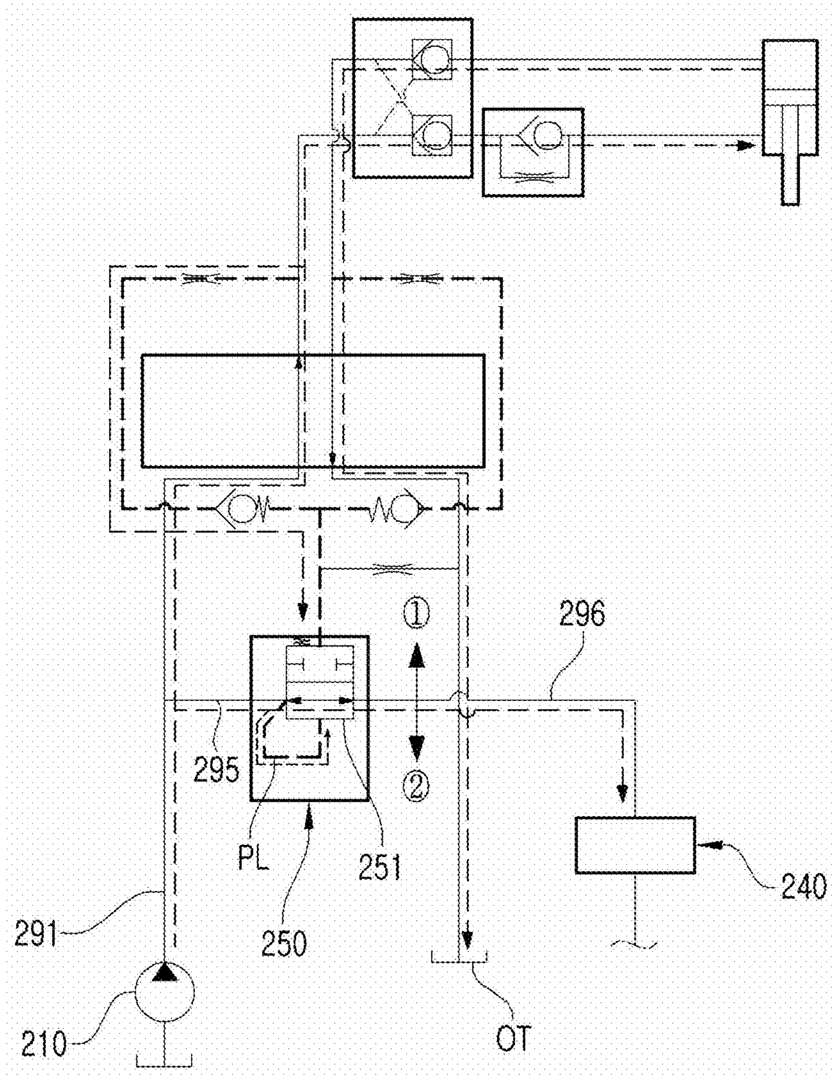

FIGS. 20 and 21 show the flow of the overall flow in the second state (see the dotted arrows).

In the second state shown in FIG. 13, the flow output from the hydraulic pump 210 is used for the operation of the horizontal control cylinder 220 in one direction.

The flow output from the hydraulic pump 210 flows into the first area S1 of the horizontal control cylinder 220 through the pump line 291, the horizontal control valve 230, the first connection line 292*a*, the first line check valve 271, the orifice check valve circuit 280, and the first operation line 293*a*. The piston rod 221 of the horizontal control cylinder 220 moves in direction ③. The horizontality of the working machine connected to the piston rod 221 is adjusted by the amount of movement of the piston rod 221. The flow in the second area S2 of the horizontal control cylinder 220 is collected in the oil tank OT through the second operation line 293*b*, the second line check valve 272, the second connection line 292*b*, the horizontal control valve 230, and the collection line 294.

The flow separated from the first connection line 292*a* to the first pilot line 261*a* applies second hydraulic pressure to the movable element 251 in direction ②. Part of the flow output from the hydraulic pump 210 is separated from the pump line 291 to a branch line 295. The branched flow applies first hydraulic pressure to the movable element 251 through the pressure line PL in direction ①.

When the flow smaller than or equal to the amount required for the operation of the horizontal control cylinder 220 is output from the hydraulic pump 210, the first hydraulic pressure becomes lower than the sum of the elastic force of the spring 252 and the second hydraulic pressure. As shown in FIG. 20, the movable element 251 is moved in direction ②, so that the lifting connection valve 250 enters a closed state. In this state, the overall flow output from the hydraulic pump 210 is used only to control the horizontality of the working machine. In other words, in this state, the overall flow output from the hydraulic pump 210 is used only for the operation of the horizontal control cylinder 220.

When the flow larger than the amount required to operate the horizontal control cylinder 220 is output from the hydraulic pump 210, the first hydraulic pressure becomes higher than the sum of the elastic force of the spring 252 and the second hydraulic pressure. As shown in FIG. 21, the movable element 251 is moved in direction ①, so that the lifting connection valve 250 enters an opened state. In this state, the flow output from the hydraulic pump 210 is used only to control the horizontality of the working machine, and the additional flow left is used to selectively lift and lower the working machine. In other words, in this state, the additional flow left out of the flow output from the hydraulic pump 210 after being used for the operation of the horizontal control cylinder 220 is used for the operation of the lifting control cylinder.

That is, the flow output from the hydraulic pump 210 is preferentially used to operate the horizontal control cylinder 220. However, when there is the additional flow left out of the flow output from the hydraulic pump 210, it is also used to operate the lifting control cylinder 220.

According to an example of the present disclosure described above, while horizontal control is performed by the horizontal control cylinder 220, the flow output from the hydraulic pump 210 is preferentially provided to the horizontal control valve 230. However, when there is the additional flow left after being used for the operation of the horizontal control cylinder 220, the additional flow is provided to the lifting control valve 240, thereby operating the lifting control cylinder.

3. Operation in Third State

Figure 22:
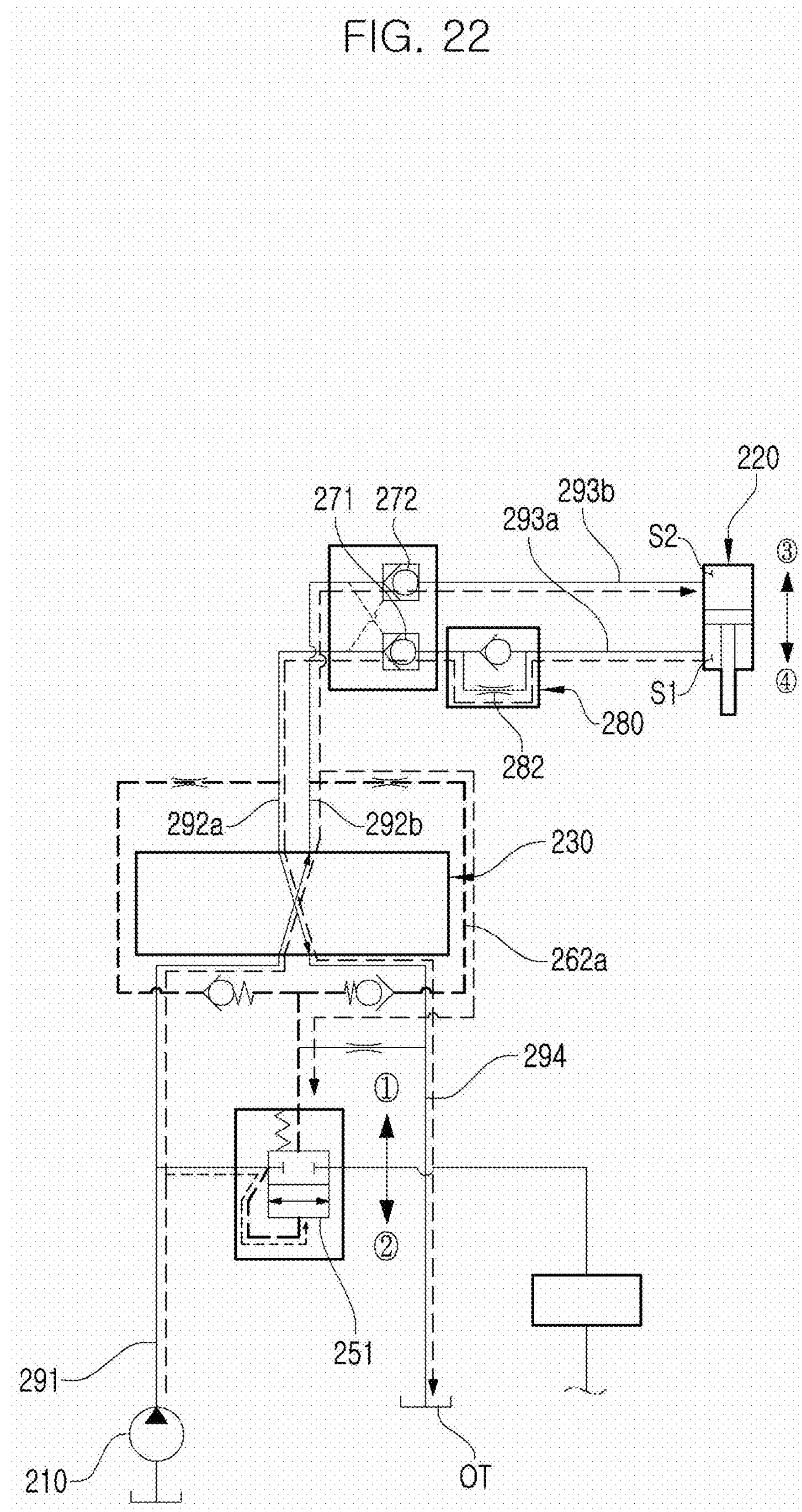
Figure 23:
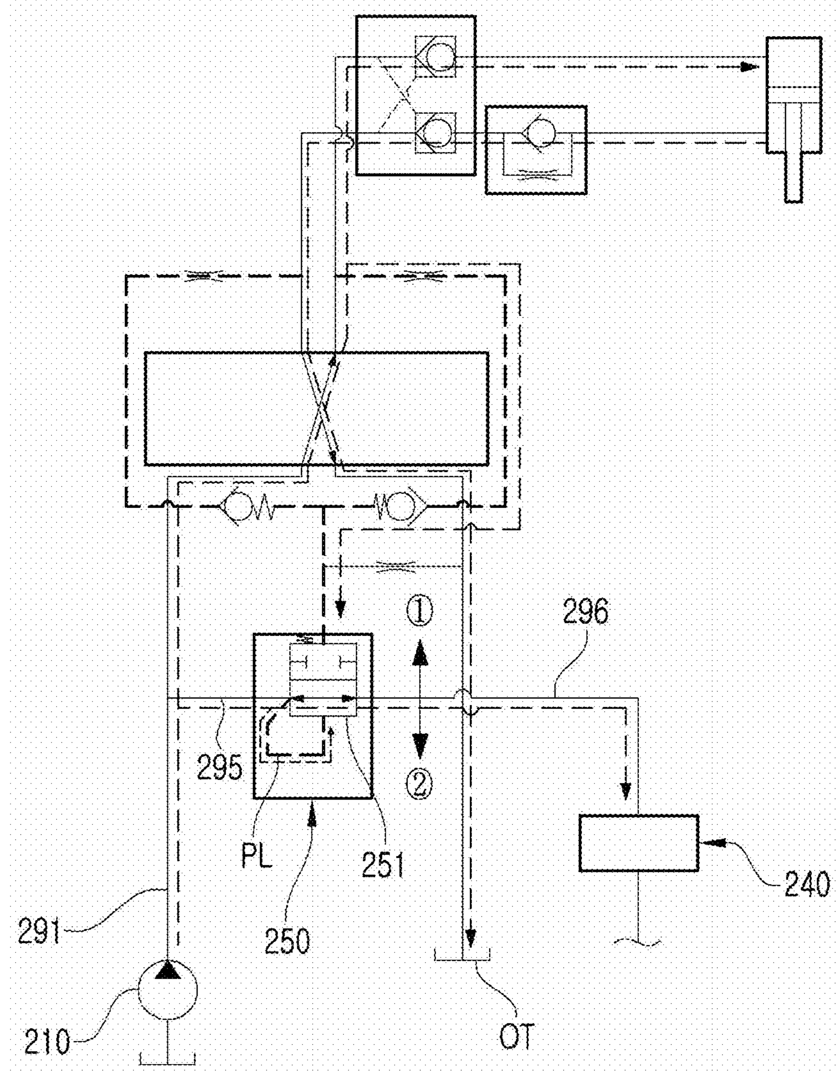

FIGS. 22 and 23 show the flow of the overall flow in the third state (see the dotted arrows).

In the third state shown in FIG. 14, the flow output from the hydraulic pump 210 is used to operate the horizontal control cylinder 220 in the other direction.

The flow output from the hydraulic pump 210 flows into the second area S2 of the horizontal control cylinder 220 through the pump line 291, the horizontal control valve 230, the second connection line 292*b*, the second line check valve 272, and the second operation line 293*b*. The piston rod 221 of the horizontal control cylinder 220 moves in direction ④. The flow in the first area S1 of the horizontal control cylinder 220 is collected in the oil tank OT through the first operation line 293*a*, the setting valve 282 of the orifice check valve circuit 280, the first line check valve 271, the first connection line 292*a*, the horizontal control valve 230, and the collection line 294.

The flow separated from the second connection line 292*b* to the second pilot line 262*a* applies second hydraulic pressure to the movable element 251 in direction ②. Part of the flow output from the hydraulic pump 210 is separated from the pump line 291 to the branch line 295. The branched flow applies first hydraulic pressure to the movable element 251 through the pressure line PL in direction ①.

When the flow smaller than or equal to the amount required for the operation of the horizontal control cylinder 220 is output from the hydraulic pump 210, the first hydraulic pressure becomes lower than the sum of the elastic force of the spring 252 and the second hydraulic pressure. As shown in FIG. 22, the movable element 251 is moved in direction ②, so that the lifting connection valve 250 enters a closed state. In this state, the overall flow output from the hydraulic pump 210 is used only to control the horizontality of the working machine. In other words, in this state, the overall flow output from the hydraulic pump 210 is used only for the operation of the horizontal control cylinder 220.

When the flow higher than the amount required for the operation of the horizontal control cylinder 220 is output from the hydraulic pump 210, the first hydraulic pressure becomes higher than the sum of the elastic force of the spring 252 and the second hydraulic pressure. As shown in FIG. 23, the movable element 251 is moved in direction ①, so that the lifting connection valve 250 enters an opened state. In this state, the flow output from the hydraulic pump 210 is used only to control the horizontality of the working machine, and the additional flow left after being used is used to selectively lift and lower the working machine. In other words, in this state, the additional flow left out of the flow output from the hydraulic pump 210 after being used for the operation of the horizontal control cylinder 220 is used for the operation of the lifting control cylinder.

As described above, according to the hydraulic circuit 100 according to the present disclosure, the flow output from the hydraulic pump 210 is preferentially used to operate the horizontal control cylinder 220. However, when there is the additional flow left out of the flow output from the hydraulic pump 210, it is also used to operate the lifting control cylinder 220.

For reference, an example in which the hydraulic pump 210 outputs the flow larger than the amount required to operate the horizontal control cylinder 220 will be additionally described.

For example, by increasing the flow output from the hydraulic pump 210, the flow larger than the amount required to operate the horizontal control cylinder 220 may be output from the hydraulic pump 210.

For example, even in the case where the flow output from the hydraulic pump 210 is the same, when the amount required to operate the horizontal control cylinder 220 is reduced by adjusting the degree of the flow passing through the horizontal control valve 230 provided as a proportional control valve, the flow larger than the amount required for operation of the horizontal control cylinder 220 may be output from the hydraulic pump 210.

In the second or third state, the flow output from the hydraulic pump 210 is preferentially used to operate the horizontal control cylinder 220. However, the additional flow left out of the flow required for the operation of the horizontal control cylinder 220 is used to operate the lifting control cylinder. In this manner, in the second or third state, only the horizontal control cylinder 220 may operate, or the horizontal control cylinder 220 and the lifting control cylinder may operate together.

According to the present disclosure, the following advantages may be achieved.

First, the loss of the flow output from the hydraulic pump is minimized, so that the efficiency of use of hydraulic pressure can be increased.

Second, the appropriate distribution of the flow may be achieved in response to various demands in the horizontal control valve, so that the precision of the horizontal and height control of a working machine and responsiveness to control are improved.

Third, the opening and closing of the lifting connection valve is controlled by the pilot circuit, so that the design for the control is simplified because the lifting connection valve operates using its own hydraulic pressure within the hydraulic circuit without requiring special electrical control.

Fourth, stable posture may be maintained rapidly and preferentially because the flow left after being used for horizontal control is used for lifting control, so that the stability of the agricultural tractor can be improved.

The above-described embodiments have been described merely as examples of the present disclosure, and may have various application forms. Accordingly, the present disclosure should not be understood as limited to the details described above. Instead, the scope of the present disclosure should be defined based on the attached claims and their equivalents.

What is claimed is:

1. A hydraulic circuit for an agricultural tractor, the hydraulic circuit comprising:

a hydraulic pump configured to supply hydraulic oil;

a horizontal control cylinder configured to control horizontality of a working machine for a work target surface by using a flow output from the hydraulic pump;

a horizontal control valve disposed between the hydraulic pump and the horizontal control cylinder, and configured to control operation of the horizontal control cylinder;

a lifting control valve configured to control operation of a lifting control cylinder that controls a height of the working machine for the work target surface by using the flow output from the hydraulic pump;

a lifting connection valve disposed between the hydraulic pump and the lifting control valve, and configured to selectively connect and block a flow path between the hydraulic pump and the lifting control valve; and a basic hydraulic line forming flow paths between the hydraulic pump, the horizontal control cylinder, the horizontal control valve, the lifting control valve, and the lifting connection valve;

wherein the basic hydraulic line comprises:

a pump line connecting the hydraulic pump and the horizontal control valve; and a branch line branching off from the pump line, and connected to the lifting connection valve, wherein the lifting control valve controls whether to operate the lifting control cylinder by selectively connecting and blocking a flow path between the lifting connection valve and the lifting control cylinder, wherein the lifting connection valve is provided such that, while the operation of the horizontal control cylinder is stopped, an overall flow output from the hydraulic pump is provided to the lifting control valve.

2. The hydraulic circuit of claim 1, wherein:

the lifting connection valve is selectively opened and closed using part of the flow output from the hydraulic pump; and the lifting connection valve is closed to block the flow path between the hydraulic pump and the lifting control valve, and is opened to connect the flow path between the hydraulic pump and the lifting control valve.

3. The hydraulic circuit of claim 2, further comprising a pilot circuit configured to generate hydraulic pressure intended to close the lifting connection valve by using a flow separated from a flow moving through the basic hydraulic line;

wherein the lifting connection valve has a pressure line that generates hydraulic pressure to open the lifting connection valve by using a flow separated from a flow moving through the branch line.

4. The hydraulic circuit of claim 3, wherein the lifting connection valve comprises a movable element that moves in a direction in which the lifting connection valve is closed by hydraulic pressure of the pilot circuit or in a direction in which the lifting connection valve is opened by hydraulic pressure of the pressure line.

5. The hydraulic circuit of claim 4, wherein the lifting connection valve further comprises a spring that applies elastic force to move the movable element in the direction in which the lifting connection valve is closed.

6. The hydraulic circuit of claim 4, wherein:

the basic hydraulic line further comprises a first connection line and a second connection line that are disposed such that a flow having passed through the horizontal control valve moves toward the horizontal control cylinder; and the pilot circuit generates hydraulic pressure to close the lifting connection valve by using a flow separated from a flow moving through the first connection line or the second connection line.

7. The hydraulic circuit of claim 6, wherein the pilot circuit comprises:

a first pilot line that branches off from the first connection line;

a second pilot line that branches off from the second connection line; and a pressurization line that applies hydraulic pressure to the movable element in a direction in which the lifting connection valve is closed by using a flow coming from the first pilot line or the second pilot line.

8. The hydraulic circuit of claim 7, wherein the pilot circuit comprises:

a first limiting valve that is installed on the first pilot line and limits a flow input to the first pilot line; and a second limiting valve that is installed on the second pilot line and limits a flow input to the second pilot line.

9. The hydraulic circuit of claim 7, wherein the pilot circuit comprises:

a first check valve that is installed on the first pilot line and allows a flow, input to the first pilot line, to move only toward the pressurization line; and a second check valve that is installed on the second pilot line and allows a flow, input to the second pilot line, to move only toward the pressurization line.

10. A hydraulic circuit for an agricultural tractor, the hydraulic circuit comprising:

a hydraulic pump configured to supply hydraulic oil;

a horizontal control cylinder configured to control horizontality of a working machine for a work target surface by using a flow output from the hydraulic pump;

a horizontal control valve disposed between the hydraulic pump and the horizontal control cylinder, and configured to control operation of the horizontal control cylinder;

a lifting control valve configured to control operation of a lifting control cylinder that controls a height of the working machine for the work target surface by using the flow output from the hydraulic pump;

a lifting connection valve disposed between the hydraulic pump and the lifting control valve, and configured to selectively connect and block a flow path between the hydraulic pump and the lifting control valve;

a pilot circuit provided to close the lifting connection valve so that the lifting connection valve blocks a flow path between the hydraulic pump and the lifting control valve; and a basic hydraulic line forming flow paths between the hydraulic pump, the horizontal control cylinder, the horizontal control valve, the lifting control valve, the lifting connection valve, and the pilot circuit;

wherein the pilot circuit generates hydraulic pressure intended to close the lifting connection valve by using a flow separated from a flow moving through the basic hydraulic line, wherein the lifting control valve controls whether to operate the lifting control cylinder by selectively connecting and blocking a flow path between the lifting connection valve and the lifting control cylinder, wherein the lifting connection valve is provided such that, while the operation of the horizontal control cylinder is stopped, an overall flow output from the hydraulic pump is provided to the lifting control valve.

11. The hydraulic circuit of claim 10, wherein:

the lifting connection valve has a pressure line that generates hydraulic pressure intended to open the lifting connection valve to connect a flow path between the hydraulic pump and the lifting control valve; and the pressure line generates hydraulic pressure intended to open the lifting connection valve by using a flow separated from the basic hydraulic line.

12. The hydraulic circuit of claim 11, wherein the lifting connection valve is selectively opened and closed by hydraulic pressure formed in the pilot circuit and the pressure line.

13. The hydraulic circuit of claim 12, wherein the lifting connection valve comprises a movable element that moves in a direction in which the lifting connection valve is closed by hydraulic pressure of the pilot circuit or in a direction in which the lifting connection valve is opened by hydraulic pressure of the pressure line.

14. The hydraulic circuit of claim 13, wherein the lifting connection valve further comprises a spring that applies elastic force to move the movable element in the direction in which the lifting connection valve is closed.

15. A hydraulic circuit for an agricultural tractor, the hydraulic circuit comprising:

a hydraulic pump configured to supply hydraulic oil;

a horizontal control cylinder configured to control horizontality of a working machine for a work target surface by using a flow output from the hydraulic pump;

a horizontal control valve disposed between the hydraulic pump and the horizontal control cylinder, and configured to control operation of the horizontal control cylinder;

a lifting control valve configured to control operation of a lifting control cylinder that controls a height of the working machine for the work target surface by using the flow output from the hydraulic pump; and a lifting connection valve provided such that, while the horizontal control cylinder is operating, a flow output from the hydraulic pump is preferentially provided to the horizontal control valve and an additional flow left after being used for operation of the horizontal control cylinder is provided to the lifting control valve, wherein the lifting control valve controls whether to operate the lifting control cylinder by selectively connecting and blocking a flow path between the lifting connection valve and the lifting control cylinder, wherein the lifting connection valve is provided such that, while the operation of the horizontal control cylinder is stopped, an overall flow output from the hydraulic pump is provided to the lifting control valve.

* * * * *